United States Patent
Iguchi et al.

(10) Patent No.: US 7,071,461 B2
(45) Date of Patent: Jul. 4, 2006

(54) OPTICAL ENCODER HAVING TELECENTRIC OPTICAL SYSTEM

(75) Inventors: Hiroshi Iguchi, Okayama (JP); Ikuo Takeda, Osaka (JP); Hirokazu Yauchi, Kyoto (JP); Arata Nakamura, Osaka (JP)

(73) Assignee: OMRON Corporation, Kyoto (JP)

( * ) Notice: Subject to any disclaimer, the term of this patent is extended or adjusted under 35 U.S.C. 154(b) by 289 days.

(21) Appl. No.: 10/359,281

(22) Filed: Feb. 6, 2003

(65) Prior Publication Data

US 2003/0209658 A1 Nov. 13, 2003

(30) Foreign Application Priority Data

Feb. 13, 2002 (JP) ............................. 2002-035139
Jan. 23, 2003 (JP) ............................. 2003-014476

(51) Int. Cl.
*G01D 5/34* (2006.01)
(52) U.S. Cl. ................................. 250/231.13
(58) Field of Classification Search ................................
250/231.13–231.18, 208.1; 356/27, 28
See application file for complete search history.

(56) References Cited

U.S. PATENT DOCUMENTS

| | | | |
|---|---|---|---|
| 3,879,136 A * | 4/1975 | Takeda | 356/447 |
| 4,075,478 A * | 2/1978 | Walker | 250/231.13 |
| 5,260,568 A | 11/1993 | Ieki | |
| 6,411,376 B1 * | 6/2002 | Southam et al. | 356/237.1 |
| 6,465,773 B1 | 10/2002 | Rodi | |
| 6,591,220 B1 | 7/2003 | Rodi | |
| 6,642,506 B1 * | 11/2003 | Nahum | 250/231.13 |

FOREIGN PATENT DOCUMENTS

| | | |
|---|---|---|
| CN | 1183546 A | 5/1998 |
| JP | 61-10517 | 1/1986 |
| JP | 08-061992 | 8/1996 |
| JP | 2001-133290 A | 5/2001 |
| JP | 2001-183171 | 7/2001 |
| JP | 2001-183174 | 7/2001 |

OTHER PUBLICATIONS

Patent Abstracts of Japan, "Optical Displacement Detecting Device," JP 10-132612A, (1998), Abstract only.

* cited by examiner

*Primary Examiner*—David Porta
*Assistant Examiner*—Tony Ko
(74) *Attorney, Agent, or Firm*—Foley & Lardner LLP

(57) ABSTRACT

An optical encoder including a graduation plate inscribed with a graduation line along a predetermined direction and an optical reader for optically reading the graduation line on the graduation plate in which a corresponding electric signal is outputted from the optical reader in accordance with movement of the graduation plate and the optical reader relative to each other, the optical reader includes a light projecting optical system for irradiating light from a light projecting source to the graduation plate and a light receiving optical system for focusing light from the graduation plate to a light receiving portion and the light receiving optical system is constituted by a telecentric optical system to thereby enable to be fabricated at low cost by dispensing with high integrating accuracy.

13 Claims, 22 Drawing Sheets

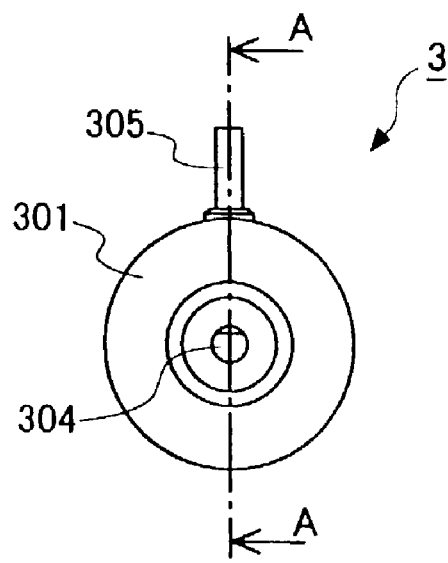
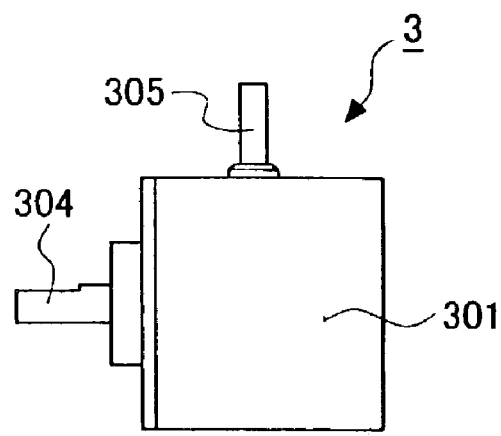
Fig. 5A       Fig. 5B
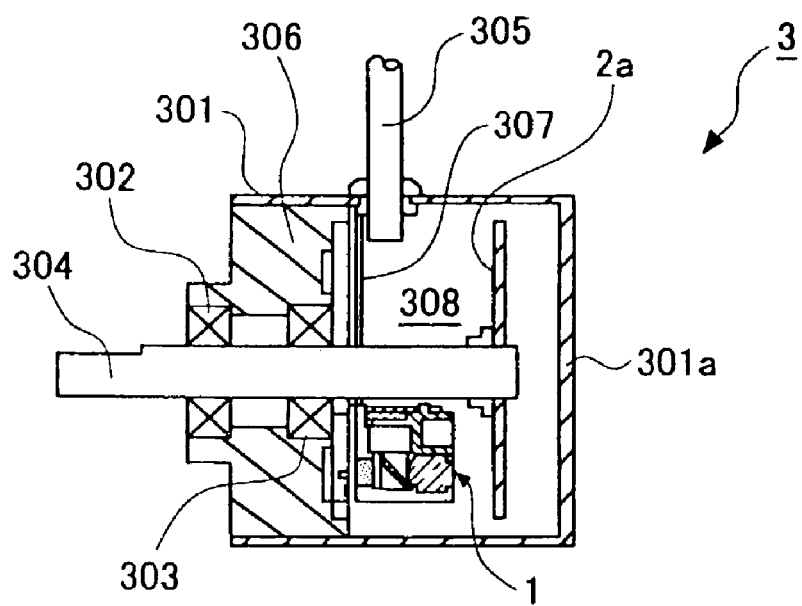
Fig. 5C

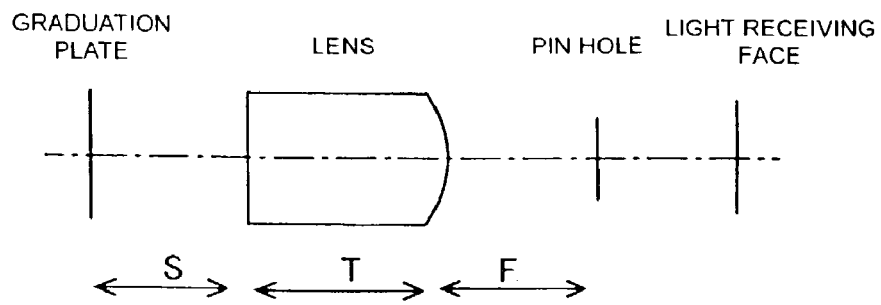
*Fig. 19A*
| | | | | | |
|---|---|---|---|---|---|
| CONDITION | S (mm) | 5.0 | 5.0 | 5.0 | 5.0 |
| | T (mm) | 5.0 | 5.0 | 5.0 | 5.0 |
| | F (mm) | 3.2 | 3.6 | 4.0 | 5.0 |
| MODULATION VALUE AT 50 PIECES/mm | | 0.45 | 0.44 | 0.40 | 0.30 |
*Fig. 19B*
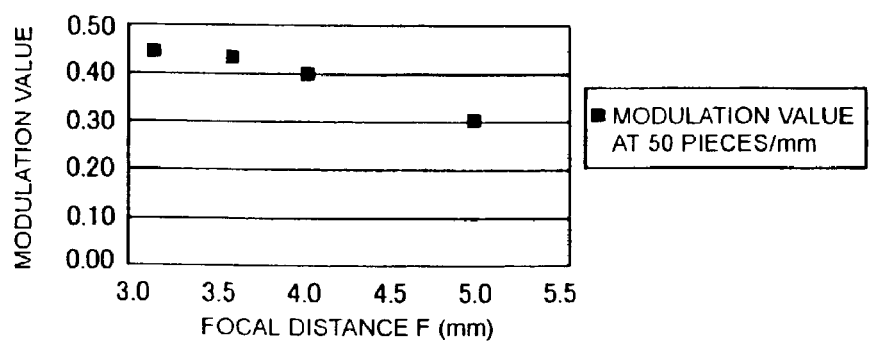
*Fig. 19C*

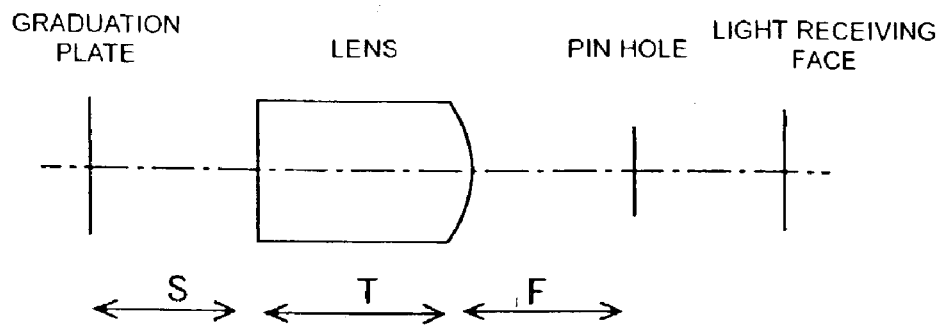
Fig. 20A
| CONDITION | S (mm) | 5.0 | 5.0 | 5.0 |
|---|---|---|---|---|
| | T (mm) | 4.0 | 5.0 | 6.0 |
| | F (mm) | 4.7 | 4.7 | 4.7 |
| MODULATION VALUE AT 50 PIECES/mm | | 0.29 | 0.40 | 0.37 |
Fig. 20B
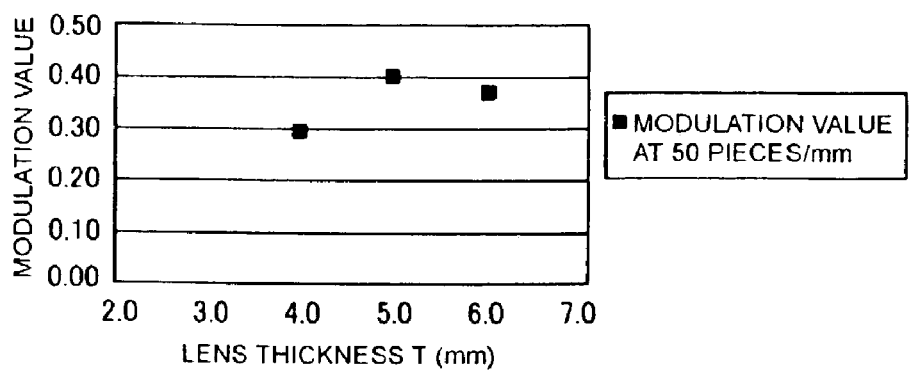
Fig. 20C

OPTICAL ENCODER HAVING TELECENTRIC OPTICAL SYSTEM

BACKGROUND OF THE INVENTION

1. Field of the Invention

The present invention relates to an optical encoder, particularly to an optical encoder enabling to be fabricated at low cost by dispensing with high assembling accuracy by adopting a telecentric optical system.

2. Description of the Related Art

As is well known, an optical encoder of this kind includes a graduation plate inscribed with a graduation line along a predetermined moving direction and an optical reader for optically reading the graduation line on the graduation plate. When the graduation plate and the optical reader are moved relative to each other in cooperation with movement of a detection object, a corresponding electric signal is outputted from the optical reader.

A mode of a graduation plate differs between a case of a rotary encoder and a case of a linear encoder. In the case of the rotary encoder, a rotating disk is adopted as a graduation plate and the graduation plate and an optical reader are supported movably relative to each other in a circumferential direction. In the case of the linear encoder, a slender long plate (referred to as "scale" or the like) is used as a graduation plate and the graduation plate and the optical reader are supported movably relative to each other in a linear direction.

Significance of a graduation line inscribed on a graduation plate differs between a case of an increment type encoder and a case of an absolute type encoder. In the case of the increment type encoder, graduation lines are inscribed on a graduation plate over one or two or more of rows at equal pitch. When the graduation plate and the optical reader are moved relative to each other, single phase or multi-phase pulse rows of a number in correspondence with a moving distance or a rotating angle are outputted from the optical reader. In a general example, the two phase pulse rows having a phase difference of 90° are outputted from the optical reader. In the case of the absolute type encoder, respective rows on the graduation plate are inscribed with graduation lines in correspondence with multi-bit codes indicating absolute positions thereof. When the graduation plate and the optical reader are moved relative to each other, the multi-bit codes directly indicating a moving position or a rotating angle are outputted from the optical reader. In a general example, gray codes are adopted as the multi-bit codes inscribed on the graduation plate.

A method of inscribing the graduation line on the graduation plate differs by whether a style of the optical reader is a transmission type or a reflection type. When the style of the optical reader is the transmission type, the graduation line is inscribed on the graduation plate by penetrating a slit through a light blocking plate of a metal or the like by etching, or making a linear transparent portion emerge on a glass plate having a light blocking film by carrying out etching treatment. When the style of the optical reader is the reflection type, the graduation line is inscribed on the graduation plate by forming a mirror face reflecting portion by vapor-depositing a metal-made film on a glass plate and thereafter making a linear transparent portion emerge by carrying out etching treatment or carrying out printing treatment having high contrast on a surface of a material plate. In the case of use requesting high accurate positional detection, a pitch of inscribing the graduation line falls in a range of several 10 µm through several 100 µm.

The optical reader includes a light projecting optical system for irradiating light from a light projecting source to the graduation plate and a light receiving optical system for focusing the light from the graduation plate to a light receiving portion. In the case of the transmission type optical reader, the light projecting optical system including the light projecting source and the light receiving optical system including the light receiving portion are arranged oppositely to each other while interposing the graduation plate. In the case of the reflection type optical reader, the light projecting optical system including the light projecting source and the light receiving optical system including the light receiving portion are summarizingly arranged on one side of the graduation plate.

Further, a detecting system utilizing diffraction interference is also adopted in a highly fine detection region having a constant correlation between the pitch of the correlation line on the graduation plate and light wavelength of a semiconductor laser constituting the light projecting source.

According to the optical encoder of this kind, in order to enable highly accurate positional measurement, in a procedure of moving the graduation plate and the optical reader relative to each other, a clear image of the graduation line needs to continue focusing on a light receiving face via the light receiving optical system.

However, as the light receiving optical system of the transmission type optical encoder, a lens having comparatively shallow object depth is used and therefore, when the distance between the graduation plate and the optical reader is varied by applying excessively large shaft load or fluctuating the rotating disk in the rotary encoder, immediately, clearness or size of the graduation line image focused on the light receiving face is also varied, a noise component emerges in an output signal of the optical reader, as a result, detection accuracy is deteriorated regardless of the absolute type or the increment type.

Further, in the case of the increment type encoder adopting the transmission type optical reader, in order to exclude influence or stray light from a contiguous slit (graduation line) on the graduation plate, a clearance between the graduation plate and the light blocking plate needs to be controlled strictly, high assembling accuracy is needed and an increase in cost is brought about.

FIG. 21 is a view showing a structure of a transmission type rotary encoder used in a related art and FIG. 22 enlarges an essential portion indicated by a one-dotted chain line circle Y in FIG. 21 for convenience of explanation. In FIGS. 21 and 22, numeral 802 designates a light emitting diode (LED), numeral 801 designates a case of the light emitting diode (LED), numeral 803 designates a rotating disk, numeral 804 designates a light blocking plate, numeral 805 designates a light receiving element, numeral 806 designates a board for mounting the light receiving element and numeral 807 designates a case of the rotary encoder, respectively.

As is shown by an enlarged view of FIG. 22, a clearance C between the graduation plate (rotating disk 803) and the light blocking plate 804 is extremely narrow and therefore, in addition to the above-described problem, in the case of the rotary encoder, when the rotating disk 803 is inclined by applying excessively large shaft load, the rotating disk 803 is brought into abrasive contact with the light receiving portion (light receiving plate 804 and light receiving element 805) and destruction is brought about.

Meanwhile, as an encoder adopting a reflection type optical reader, there is a diffraction interference reflecting type linear encoder, however, from the detection principle, the pitch of the graduation line is obliged to be small in relation to wavelength of laser and the encoder cannot deal with a variety of pitches (resolution). In addition thereto, a special scale is needed, which is devoid of general purpose performance.

Meanwhile, in the case of an encoder adopting a reflection type optical reader having a light projecting optical axis and a light receiving optical axis independently from each other, the two optical axes are inclined symmetrically relative to a normal line of the graduation plate and therefore, a variation in clearness or size of the graduation line image by fluctuating or inclining the graduation plate is considerable and the encoder cannot be reduced to practice for use of highly accurate detection.

SUMMARY OF THE INVENTION

The present invention has been carried out by paying attention to the above-described problems and it is an object thereof to provide an optical encoder capable of being fabricated at low cost by dispensing with high integrating accuracy.

It is other object of the invention to provide an optical encoder in which an output signal from an optical reader is maintained stably even when a distance between a graduation plate and the optical reader is more or less varied.

It is other object of the invention to provide a reflection type optical reader module having high general purpose performance enabling to easily realize a reflection type optical reader in correspondence with graduation plates having various graduation line pitches by only interchanging a small number of parts in accordance with the graduation line pitch of a graduation plate used.

It is other object of the invention to provide a transmission type optical reader module enabling to easily realize a transmission type optical reader in correspondence with graduation plates having various graduation line pitches by only interchanging a small number of parts in accordance with the graduation line pitch of the graduation plate used.

It is other object of the invention to provide a graduation plate preferable for the above-described optical encoder or reflection type optical reader module and capable of easily reading with a highly fine pitch.

The skilled person can easily understand still other object and operation and effect of the invention by referring to the description of the specification as follows.

An optical encoder of the invention includes a graduation plate inscribed with a graduation line along a predetermined direction and an optical reader for optically reading the graduation line on the graduation plate and a corresponding electric signal is outputted from the optical reader in accordance with movement of the graduation plate and the optical reader relative to each other. The optical reader includes a light projecting optical system for irradiating light from a light projecting source to the graduation plate and a light receiving optical system for focusing light from the graduation plate to a light receiving portion. Further, the important point of the invention resides in that the light receiving optical system is constituted by a telecentric optical system.

Such a constitution is applicable to various styles of optical encoders regardless of transmission type/reflection type, rotary type/linear type, or increment type/absolute type. Here, as is well known, the "telecentric optical system" is an optical system in which only parallel light incident on a lens contributes to focusing by arranging a pin hole plate at a focal position of the lens.

According to the above-described constitution, since the telecentric optical system is adopted as the light receiving optical system, even when in a procedure of movement of a graduation plate and an optical reader relative to each other, a distance between the graduation plate and the optical reader is more or less varied by, for example, applying excessively large shaft load in a rotary encoder and fluctuating a rotating disk, an image of the graduation line focused on a light receiving face is always maintained in a constant clear state, a noise component is not included in an electric signal outputted from the optical reader and therefore, highly reliable positional detection can be carried out based on the electric signal.

The optical encoder of the invention may be embodied as a transmission type. In that case, the graduation line on the graduation plate is provided with a light transmitting performance and a transmission type optical reader comprising a light projecting optical system and a light receiving optical system to be coaxially and opposedly arranged while interposing the graduation plate as the optical reader. Further, the light projecting optical system includes a light projecting side source for irradiating light from the light source in the form of a spot to a face on one side of the graduation plate to include a group of the graduation lines. Further, the light receiving optical system includes a light receiving side lens for gathering light transmitting through a face on other side of the graduation plate, a pin hole plate arranged at a focal position on a front side of the light receiving side lens and a light receiving portion arranged at a focusing position of light ray after passing through the pin hole and having a light receiving array pattern in correspondence with images of the group of graduation lines. Here, as is well known, the "light receiving array pattern" is a pattern constituted by aligning a series of a plurality of small linear light receiving regions to match to an alignment of the graduation lines on the graduation plate. It should be noted that "side" is used in the number of terms in the specification. However. "side" is not limiting on the invention and does not change the scope of the invention.

According to such a constitution, since the light receiving optical system is integrated with the telecentric optical system comprising the light receiving side lens for gathering light transmitted through a face on other side of the graduation plate and the pin hole plate arranged at the focal position on the front side of the light receiving side lens and therefore, even when in a procedure of movement of the graduation plate and the optical reader relative to each other, a distance between the graduation plate and the optical reader is more or less varied by, for example, applying excessively large shaft load or fluctuating a rotating disk in a rotary encoder, by the operation of the telecentric optical system, mentioned above, the highly reliable positional detection can be carried out. Further, the pin hole plate may be constituted by a member separate from a module case and integrated to the module case or constituted to integrate with the module case as a portion thereof.

In addition thereto, stray light component of light ray transmitting through the graduation plate which is not in parallel with the optical axis does not contribute to focusing on the light receiving face by the operation of the telecentric optical system and therefore, even when a clearance between the light receiving optical system and the graduation plate is not strictly controlled, influence of the stray light on an output electric signal can be excluded. As a result, by alleviating a request for integrating accuracy in fabrication, the cost can be reduced by that amount.

In the transmission type optical encoder, the light receiving portion may include a light blocking plate having a slit pattern in correspondence with images of the group of graduation lines and a light receiving element disposed on a back side of the light blocking plate for receiving light ray transmitting through the slit pattern and the light receiving array pattern may be formed by exposing the light receiving element from the slit pattern.

According to such a constitution, even in the case in which a pattern of the graduation line on the graduation plate differs for respective products, when the light blocking plate having a slit pattern in coincidence with the graduation line pattern of each graduation plate is prepared, by only interchanging the light blocking plate, various product specifications can be dealt with and a further reduction in the cost can be carried out by reducing a number of parts.

The optical encoder of the invention may be embodied as a reflection type. In that case, a graduation line on a graduation plate is provided with a light reflecting performance and as an optical reader, a reflection type optical reader including a coaxially radiating type optical system is adopted. Further, the coaxially radiating type optical system includes a light projecting source, an object lens used both for projecting and receiving light for irradiating light from the projecting source in the form of a spot as parallel light ray to include a group of the graduation lines of the graduation plate and gathering reflected light from the graduation plate, an optical separator for separating forward light directed from the light projecting source to the object lens and rearward light returning from the object lens, a pin hole plate arranged at a focal position of the object lens on a front side of a light path of the rearward light separated via the optical separator and the light receiving portion arranged at a focusing position of the rearward light after passing through the pin hole plate and including a light receiving array pattern in correspondence with images of the group of graduation lines.

According to such a constitution, the coaxial radiating type optical system is integrated with the telecentric optical system comprising the object lens used both for projecting and receiving light for irradiating light from the light projecting source in the form of a spot as parallel light ray to the graduation plate to include the group of graduation lines and gathering reflected light from the graduation plate, the optical separator for separating the forward light directed from the light projecting source to the object lens and the rearward light returned from the object lens and the pin hole plate arranged at the focusing position of the object lens on the front side of the light path of the rearward light separated via the optical separator and therefore, even when in the procedure of movement of the graduation plate and the optical reader relative to each other, the distance between the graduation plate and the optical reader is more or less varied by, for example, applying excessively large shaft load or fluctuating a rotating disk in a rotary encoder, the highly reliable positional detection can be carried out by the above-described operation of the telecentric optical system. Further, the pin hole plate may be constituted by a member separate from a module case and integrated to the module case or may be constituted to be integrated to the module case as a portion thereof.

In addition thereto, a stray light component of light ray reflected from the graduation plate which is not in parallel with the optical axis does not contribute to focusing on the light receiving face by the operation of the telecentric optical system and therefore, even when a clearance between the reflection type optical reader and the graduation plate is not strictly controlled, influence of the stray light on an output electric signal can be excluded. As a result, by alleviating a request for integrating accuracy in fabrication, the cost can be reduced by that amount. Further, also with regard to the light projecting source, it is not necessary to generate parallel light. Therefore, an ordinary LED can be used without using an expensive light emitting part such as a point light source LED, an LED with lens or a laser diode (LD) which has been necessary in a transmission type encoder of a prior art and the cost can be reduced also in this respect. Further, downsizing of the optical reader can be realized by adopting an optical axis bending structure by the object lens used both for projecting and receiving light and the optical separator (half mirror or the like).

Also in the reflection type optical encoder, the light receiving portion may include a light blocking plate having a slit pattern in correspondence with images of the group of graduation lines and a light receiving element disposed on a back side of the light blocking plate for receiving light ray transmitted through the slit pattern and the light receiving array pattern may be formed by exposing the light receiving element from the slit pattern.

According to such a constitution, even in the case in which a pattern of the graduation lines on the graduation plate differs for respective products, when the light blocking plate having the slit pattern in coincidence with the pattern of the graduation lines of each graduation plate is prepared, by only interchanging the light blocking plate, various product specifications can be dealt with and a further reduction in cost can be carried out by reducing a number of parts.

According to the reflection type optical encoder, a region of the gradation line on the graduation plate may comprises a mirror face and a region between the graduation lines may comprise a rough face.

According to such a constitution, when the constitution is applied to the optical reader adopting the coaxial radiating type optical system, by the operation of the telecentric optical system, other than reflected light regularly reflected by the mirror face portion of the graduation plate does not contribute to focusing on the light receiving face and therefore, in correspondence with the rough face portion and the mirror face portion on the graduation plate, an extremely clear image of the graduation line can be focused on the light receiving face. When a thin metal plate is used as a material of the graduation plate, by roughening the surface selectively by etching while leaving the mirror face portion, a desired graduation line pattern can be formed without so much deteriorating the strength of the material plate. Therefore, according to the graduation plate constituted by combining the mirror face and the rough face, there is achieved an advantage of enabling to deal with a finer graduation line pitch than that in the case of a graduation plate of a related art produced by punching.

Further, in forming the mirror face portion and the rough face portion on the graduation plate, the rough face portion may be formed by etching the surface of the mirror face metal plate or the rough face portion may be formed by subjecting the mirror face metal plate to laser half machining.

According to the transmission type or the reflection type optical encoder, the graduation plate and the optical reader may be supported linearly movably relative to each other. According to such a constitution, a linear encoder having a small size, high accuracy and high reliability can be realized at low cost.

According to the transmission type or the reflection type optical encoder, the graduation plate and the optical reader may be supported rotationally movably relative to each other. According to such a constitution, a rotary encoder having a small size, high accuracy and high reliability can be realized at low cost.

The reflection type optical reader constituting the reflection type optical encoder may be formed by a module to constitute a general purpose part. That is, a reflection type optical reader module of the invention comprises a light projecting source, an object lens for irradiating light from the light projecting source in the form of a spot as parallel light to a graduation plate to include a group of graduation lines and returning rearward light reflected by the graduation plate to direct to the light projecting source, an optical separator disposed between the light projecting source and the object lens for separating the rearward light reflected by the graduation plate from the forward light directed from the light source to the object lens, a pin hole plate arranged at a focal position on a front side of an optical axis of the rearward light separated by the optical separator, and a light receiving portion arranged at a focusing position of light ray after passing through the pin hole plate and having a light receiving array pattern in correspondence with images of the group of graduation lines to integrally be contained in a case having a window used both for projecting and receiving light, wherein the reflection type optical reader module can be integrated to an optical encoder.

According to such a constitution, when respective optical parts are positioned at predetermined positions in the case, the positioning between the case and the rotating disk or a scale may be carried out comparatively roughly and therefore, by only attaching the reflection type optical reader module along with the case, a desired reflection type optical encoder can easily and swiftly be fabricated.

According to the reflection type optical reader module, the light receiving portion may include a light blocking plate having a slit pattern in correspondence with images of the group of graduation lines and a light receiving element disposed on a back side of the light blocking plate for receiving light ray transmitting through the slit pattern and the light receiving array pattern may be formed by exposing the light receiving element from the slit pattern.

According to such a constitution, by only changing the light blocking plate to a light blocking plate having a corresponding slit pattern while commonly using the light projecting source, the object lens, the optical separator, the pin hole plate and the light receiving element, reflection type optical encoders having various accuracies, detection ranges and sizes can be dealt with.

The transmission type optical reader constituting the transmission type optical encoder may be formed in a module to constitute a general purpose part. That is, the transmission type optical reader module of the invention contains a light projecting optical system including a light projecting source and a light projecting side lens for irradiating light from the light projecting source in the form of a spot to a face on one side of a graduation plate to include a group of light transmitting graduation lines and a light receiving optical system including a light receiving side lens for gathering light transmitting through a face on other side of the graduation plate, a pin hole plate arranged at a focal position on a front side of an optical axis of the light receiving side lens, and a light receiving portion arranged at a focusing position of light ray after passing through the pin hole plate and having a light receiving array pattern in correspondence with images of the group of graduation lines to be integrally contained in a case opposedly arranged with a light projecting optical system containing portion and a light receiving optical system containing portion while interposing an air gap portion inserted with the graduation plate and can be integrated to an optical encoder.

According to the constitution, when respective optical parts are positioned at predetermined positions in the case, the positioning between the case and the rotating disk or a scale can be carried out comparatively roughly and therefore, a desired transmission type optical encoder can easily and swiftly be fabricated by only attaching the transmission type optical reader module along with the case.

According to the transmission type optical reader module, the light receiving portion may include a light blocking plate having a slit pattern in correspondence with the images of the group of graduation lines and a light receiving element disposed on a back side of the light blocking plate for receiving light ray transmitting through the slit pattern and the light receiving array pattern may be formed by exposing the light emitting element from the slit pattern.

According to the constitution, by changing the light blocking plate to a light blocking plate having a corresponding slit pattern while commonly using the light projecting source, the light receiving side lens, the pin hole plate and the light receiving element, transmission type optical encoders having various accuracies, detection ranges and sizes can be dealt with.

According to the transmission type optical reader constituting the transmission type optical encoder, only the light receiving side optical system can be formed in a module to constitute a general purpose part. That is, a light receiving side optical module of the invention comprises a light receiving side lens for gathering light transmitted through a graduation plate inscribed with a light transmitting graduation line, a pin hole plate arranged at a focal position on a front side of an optical axis of the light receiving side lens and a light receiving portion arranged at a focusing position of light ray after passing through the pin hole plate and having a light receiving array pattern in correspondence with images of a group of the graduation lines to be integrally contained in a case having a light receiving window, wherein a transmission type reader can be constituted by integrating the light receiving side optical module to an optical encode along with a light projecting side optical system.

According to such a constitution, when respective optical parts are positioned at predetermined positions in the case, the positioning between the case and a rotating disk or a scale and positioning between the case and the light projecting side optical system may be carried out comparatively roughly and therefore, a desired transmission type optical encoder can easily and swiftly be fabricated by only attaching the light receiving side optical module along with the case and combining the light receiving side optical module with a light projecting side optical system.

Also according to the light receiving side optical module, the light receiving portion may include a light blocking plate having a slit pattern in correspondence with images of the group of graduation lines and a light receiving element arranged on a back side of the light blocking plate for receiving light ray transmitting the slit pattern and the light receiving array pattern may be formed by exposing the light receiving element from the slit pattern. In this case, when the light blocking plate constituting the light receiving portion is made attachable and detachable separately from the light receiving element, general purpose performance and integration facilitating performance are promoted.

A graduation plate for an optical encoder of the invention is a graduation plate for an encoder applied to a reflection type optical reader including a coaxially radiating type optical system constituting a lens used both for projecting and receiving light by an object side telecentric lens, wherein the graduation line comprises a mirror face reflecting face and a region between the graduation lines comprises a rough face, or the graduation line comprises a rough face and the region between the graduation lines comprises a mirror face reflecting face.

According to such a constitution, when the constitution is applied to the optical reader adopting the coaxially radiating type optical system, by the operation of the telecentric optical system, other than reflected light regularly reflected by the mirror face portion of the graduation plate does not contribute to focusing on the light receiving face and therefore, an extremely clear image of the graduation line can be focused on the light receiving face in correspondence with the rough face portion and the mirror face portion on the graduation plate. When a thin metal plate is used as a material of the graduation plate, by roughing the surface selectively by etching while leaving the mirror face portion, a desired graduation line pattern can be formed without so much deteriorating the strength of the material plate. Therefore, according to the graduation plate comprising a combination of the mirror face and the rough face, there is achieved an advantage that a finer graduation line pitch can be dealt with without deteriorating the strength of the material plate.

According to the graduation plate for an optical encoder, when the graduation line is inscribed along a circle, the graduation line is preferable for a rotary encoder. Further, according to the graduation plate for an optical encoder, when the graduation line is inscribed along a linear line, the graduation line is preferable for a linear encoder.

According to the optical encoder, when one lump of an aspherical lens is used as the telecentric optical system and a relationship of T>1.2F is specified between a thickness (T) and a focal distance (F) of the lens, the clearness of the graduation line pattern focused on the light receiving face is improved.

According to the optical encoder, when one lump of an aspherical lens is used as the telecentric optical system and a relationship of 1.2T>S>0.8T is specified between the thickness (T) of the lens and a distance (S) between the lens and the graduation plate, the clearness of the graduation line pattern focused on the light receiving face is improved.

BRIEF DESCRIPTION OF THE DRAWINGS

FIGS. 5A, 5B and 5C are explanatory views showing a structure of a rotary encoder adopting a first module attaching method;

FIGS. 19A, 19B and 19C are diagrams showing various design values of a telecentric optical system (part 1);

FIGS. 20A, 20B and 20C are diagrams showing various design values of a telecentric optical system (part 2);

DETAILED DESCRIPTION OF THE PREFERRED EMBODIMENTS

A preferable embodiment of an optical encoder according to the invention will be explained in details in reference to the attached drawings as follows.

As described above, an optical encoder of the invention includes a graduation plate inscribed with a graduation line along a predetermined direction and an optical reader for optically reading the graduation line on the graduation plate. When the graduation plate and the optical reader are moved relative to each other, a corresponding electric signal is outputted from the optical reader. The optical reader includes a light projecting optical system for irradiating light from a light projecting source to the graduation plate and a light receiving optical system for focusing light from the graduation plate to a light receiving portion. In addition thereto, it is an important point that a telecentric optical system is adopted in the light receiving optical system.

There are a transmission type and a reflection type for the optical reader. Particularly, according to the embodiment, there is adopted an optical reader module assembled with various optical parts constituting the optical reader integrally in a case. As described later, the optical reader module can commonly be used in optical encoders having various product specifications by only interchanging a small number of parts.

Figure 1:
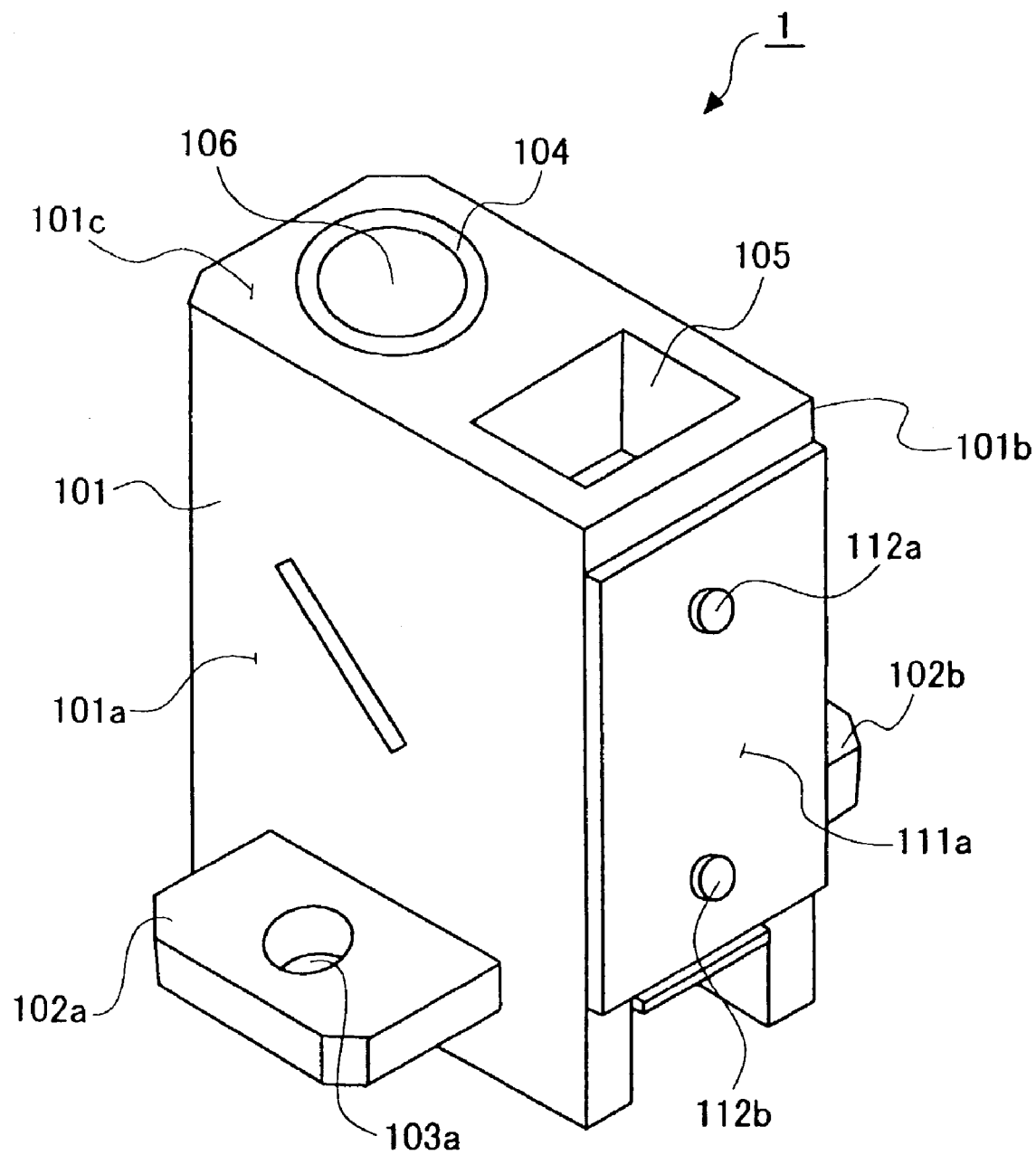
FIG. 1 is an outlook perspective view of a reflection type optical reader module.

FIG. 1 shows an outlook perspective view of a reflection type optical reader module 1 which is an example of the optical reader module. As shown by FIG. 1, the reflection type optical reader module 1 includes a module case 101 made of synthetic resin. An outer shape of the module case 101 is constituted by a rectangular shape and two left and right faces 101a and 101b thereof are integrally formed with flange-like attaching brackets 102a and 102b having screw holes 103a and 103b. A window 104 used both for projecting and receiving light is opened at a front end face 101c opposed to a graduation plate of the module case 101 and an object lens 106, mentioned later, included in the module case 101 faces from the light projecting and receiving window 104. Further, a rectangular recess 105 is a shrinkage preventing wall cut portion of a resin mold product.

Figures 2A, 2B:
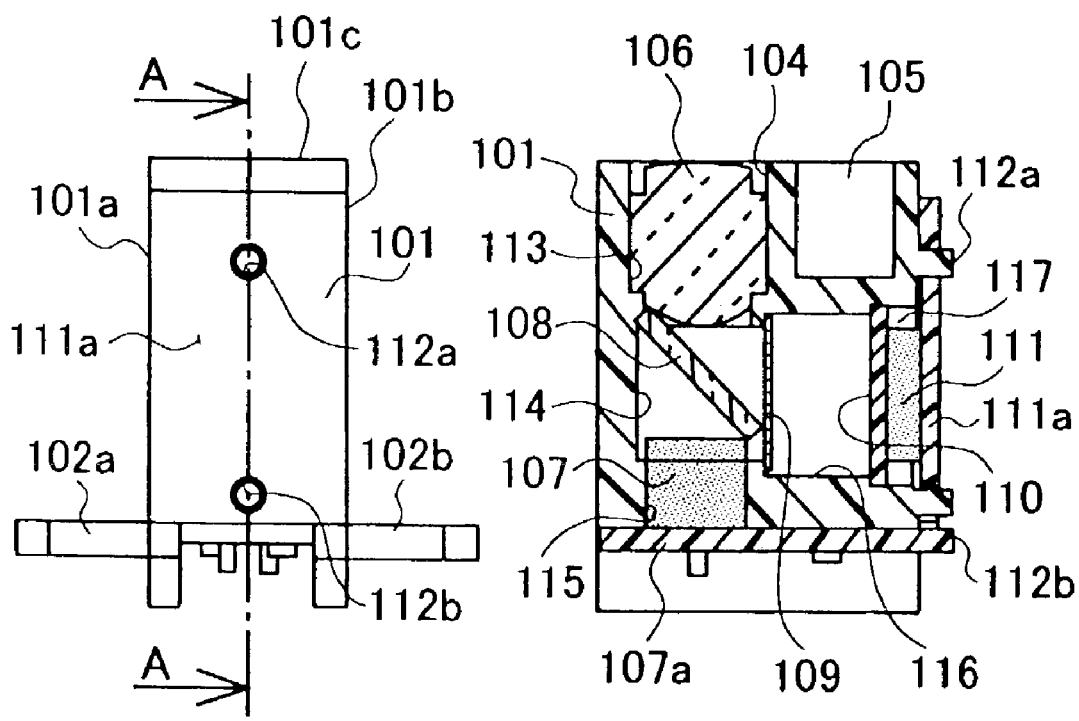
FIGS. 2A, 2B and 2C are explanatory views showing a structure of the reflection type optical reader module.
Figure 2C:
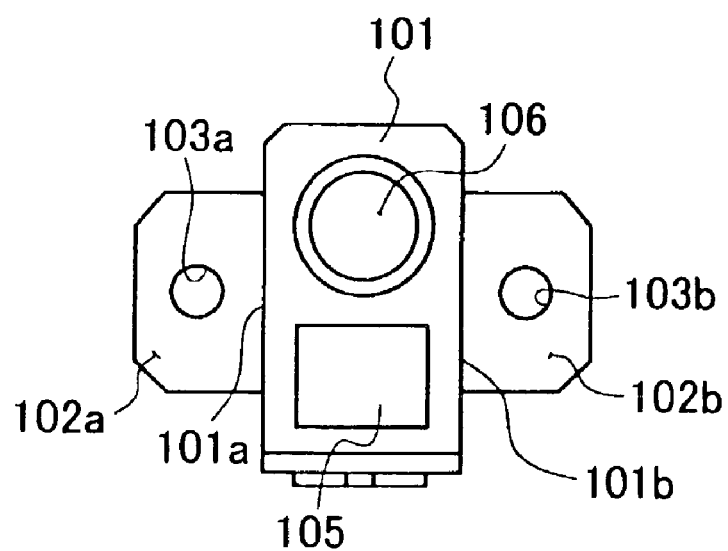

FIGS. 2A, 2B and 2C show explanatory views showing a structure of the reflection type optical reader module 1. Further, FIG. 2A is a front view, FIG. 2B is a sectional view taken from a line A—A in FIG. 2A and FIG. 2C is a plane view.

As shown mainly by FIG. 2B, respective constituent parts of a coaxial radiating type optical system functioning as the optical reader are integrated in the module case 101 of the reflection type optical reader module 1. That is, at inside of the module case 101, a vacant portion penetrating the module case 101 in a front and rear direction (in up and down direction of the drawing) is formed and the vacant portion is divided into a front chamber 113, a middle chamber 114 and a rear chamber 115. Further, the object lens 106 is contained in the front chamber 113, a half mirror 108 functioning as an optical separator is contained in the middle chamber 114 and a light emitting diode (LED) 107 functioning as a light projecting source is contained in the rear chamber 115 respectively in predetermined attitudes. Further, in a side direction of the middle chamber 114, other vacant portion passing through to a side face of the module case 101 is formed and the vacant portion is divided into an inner chamber 116 and outer chamber 117. At a boundary portion of the middle chamber 114 and the inner chamber 116 on the side path, a pin hole plate 109 having a pin hole at its center is arranged and the outer chamber 117 is contained with a laminated body of a light blocking plate 110 and a photodiode (PD) 111 which is a light receiving element constituting a light receiving portion. Further, in FIG. 2B, notation 107a designates a board for mounting the light emitting diode 107 and notation 111a designates a board for mounting the light receiving element 111.

In this example, one lump of an aspherical lens fabricated by synthetic resin is used for the object lens 106 and fixed to inside of the front chamber 113 by a method of press-fitting or adhering. As the light emitting diode 107 functioning as the light projecting source, an inexpensive ordinary light emitting diode without lens can be used. The light emitting diode 107 is fixed to the module case 101 via the board 107a in a state of being inserted into the rear chamber 115. The half mirror 108 contained in the middle chamber 114 is provided with a property of passing light directed from the light emitting diode 107 to the object lens 106 but reflecting light returning from the object lens 106 to the light emitting diode 107. A reflecting face of the half mirror 108 is inclined to an optical axis connecting the light emitting diode 107 and the object lens 106 by 45 degrees. The pin hole plate 109 is arranged at a focal position of the object lens 106. Therefore, only a component of light incident on the object lens 106 in parallel with the optical axis of the object lens 106 can pass through the pin hole of the pin hole plate 109. In other words, a component of light incident on the object lens 106 inclined to the optical axis cannot pass through the pin hole of the pin hole plate 109 and therefore, does not contribute to focusing on the light receiving face. The light blocking plate 110 is formed with a slit row pattern. A slit pitch of the slit row pattern corresponds to the graduation line pitch in a graduation line aligning pattern, not illustrated, on the graduation plate. The light receiving face of the light receiving element 111 arranged on the back side of the light blocking plate 110 is exposed in correspondence with the slit row pattern of the light blocking plate 110 and therefore, a light receiving array pattern constituting the light receiving portion is realized thereby. The light receiving face of the light receiving element 111 is contained in the outer chamber 117 in a state of being opposed to the back side of the light blocking plate 110 and fixed to the case 101 via the board 111a. The light receiving element mounting board 111a and the case 101 are fixed by fitting projections 112a and 112b on the case side to fitting holes opened at the board 111a.

Since the constitution is constructed in this way, according to the above-described reflection type optical reader module 1, a graduation plate having an arbitrary graduation line pitch can be dealt with only by removing the light receiving element 111 along with the board 111a, thereafter taking out the light blocking plate 110 from the outer chamber 117 and interchanging the light blocking plate 110 by a light blocking plate having a corresponding slit pitch and therefore, almost all the parts can commonly be used for optical encoders having various product specifications to thereby achieve a reduction in cost.

Figure 3:
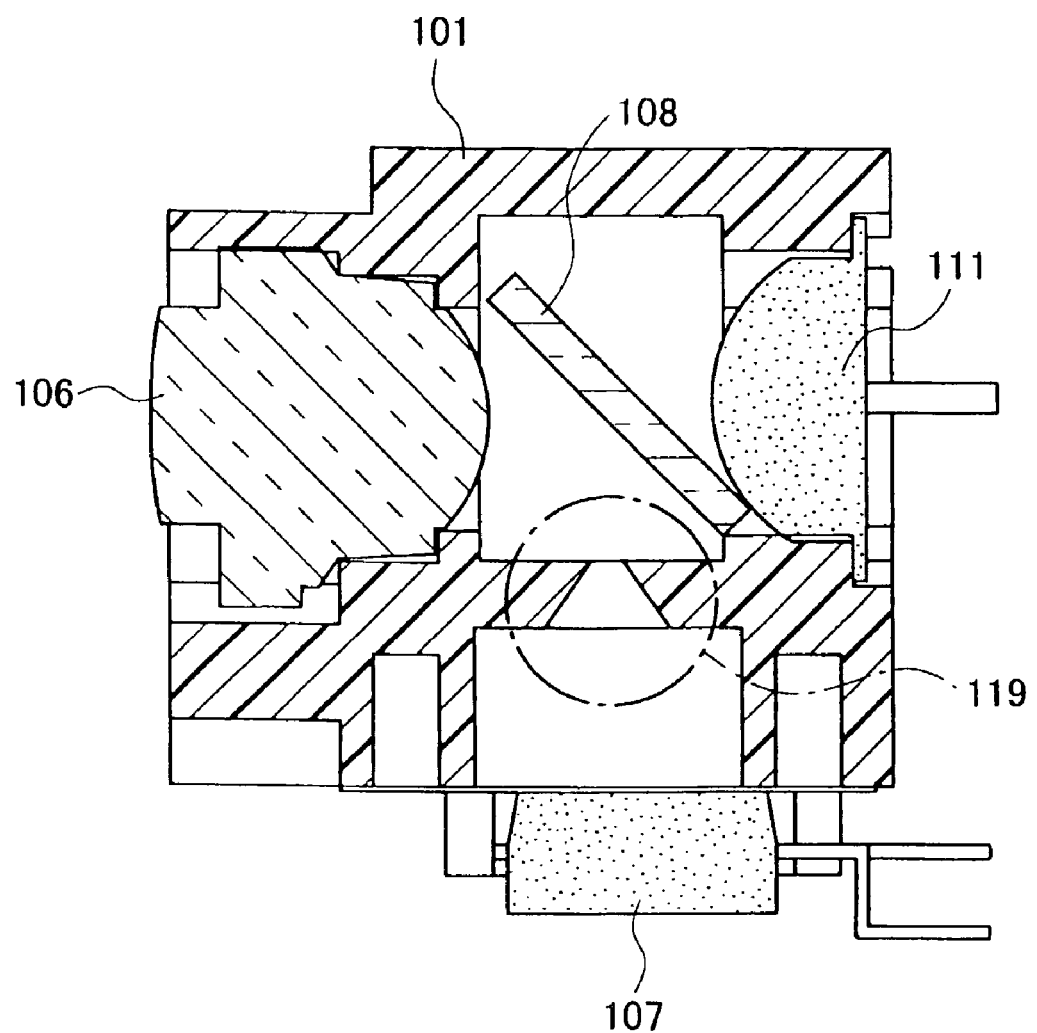
FIG. 3 is an explanatory view showing a structure of other embodiment of a reflection type optical reader module.

Although in the above-described reflection type optical reader module 1, the pin hole plate 109 is constituted as a member separate from the module case 101 and is integrated in the reflection type optical reader module, as other embodiment of a reflection type optical reader module of the invention, the pin hole plate 109 may be constituted to be integrated to the module case 101 as a portion thereof. FIG. 3 shows the embodiment. Further, in FIG. 3, constituent elements of the reflection type optical reader module are substantially the same as those in FIG. 2B and therefore, the same notations are used therefor and an explanation thereof will be omitted. A difference between the reflection type optical reader module 1 shown in FIG. 3 and the reflection type optical reader module 1 in FIG. 2B, resides in that a pin hole 119 is constituted to be integrated to the module case 101 as a portion thereof.

Figure 4:
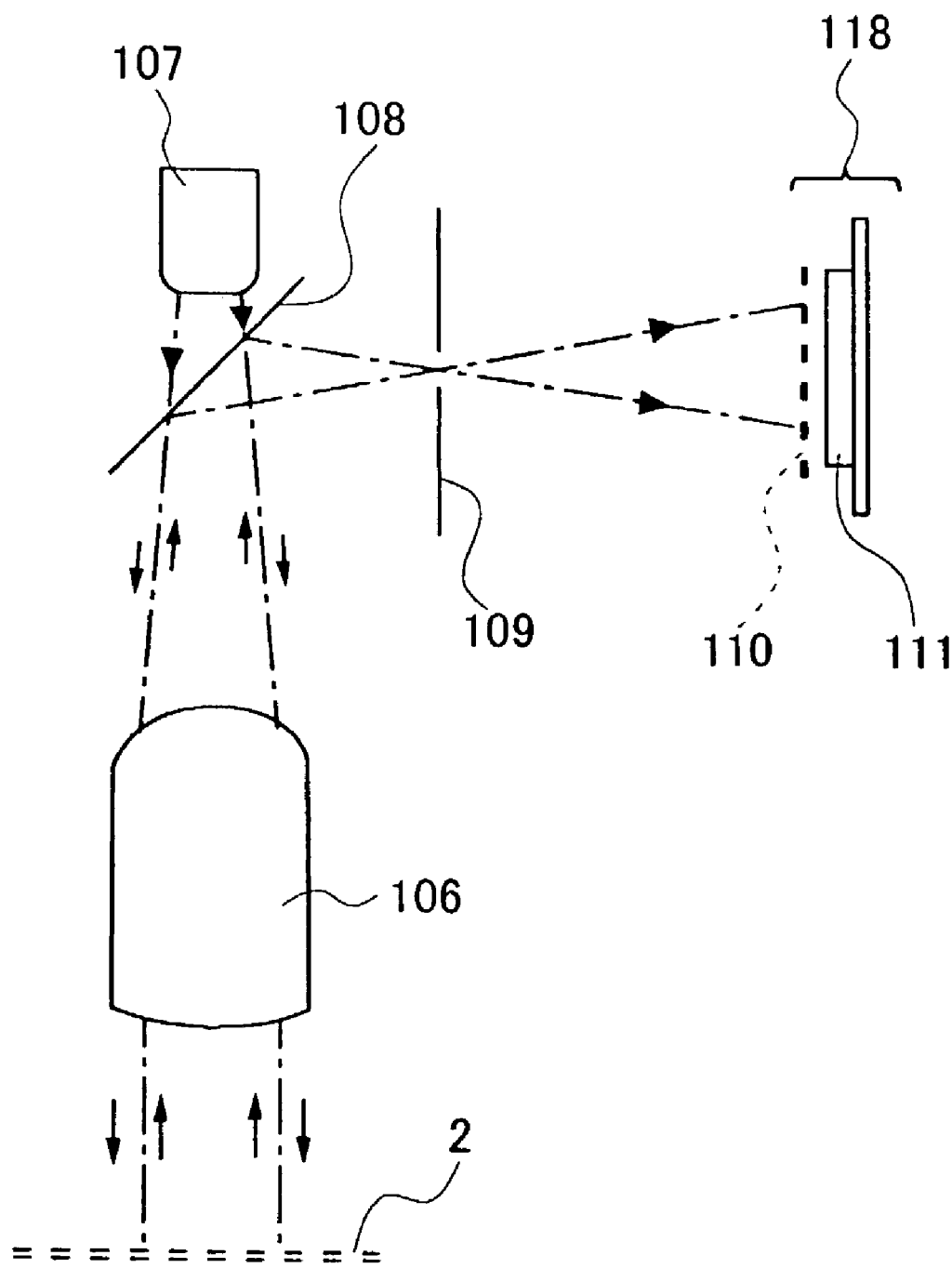
FIG. 4 is a constitution view showing a total of an optical system of a reflection type optical reader.

Next, FIG. 4 shows a constitution view for taking out to show only a total of the optical system of the reflection type optical reader module 1. As shown by FIG. 4, the reflection type optical reader includes the coaxially radiating type optical system. The coaxially radiating type optical system includes the light emitting diode 107 functioning as the light projecting source, the object lens 106 used both for projecting and receiving light for irradiating light from the light emitting diode 107 in the form of a spot to include a group of the graduation lines on the graduation plate 2 as parallel light ray and gathering reflected light from the graduation plate 2, the half mirror 108 functioning as the optical separator for separating forward light directed from the light emitting diode 107 to the object lens 106 and rearward light returning from the object lens 106, the pin hole plate 109 arranged at the focal position of the object lens on a front side of an optical path of the rearward light separated via the half mirror 108 and a light receiving portion 118 arranged at a focusing position of the rearward light after passing through the pin hole plate and having a light receiving array pattern in correspondence with images of the group of graduation lines. Here, as described above, the light receiving portion 118 includes the light blocking plate 110 having the slit row pattern in correspondence with images of the group of graduation lines and the light receiving element 111 disposed on the back side of the light blocking plate 110 for receiving light ray transmitting through the slit row pattern.

By exposing the light receiving element 111 from the slit pattern, the light receiving array pattern is formed. Further, the light receiving array pattern can also be formed by aligning a plurality of small light receiving elements on a board.

Further, in the above-described optical system of the reflection type optical reader shown by FIG. 4, although not illustrated, the light emitting diode 107, the pin hole plate 109 and the light receiving portion 118 can also be installed by switching a positional relationship thereamong. Also by such a constitution, by the well-known property of the half mirror 108 as the optical separator, it is possible to reflect the forward light directed from the light emitting diode 107 to the object lens 106 to irradiate to the object lens and pass through the rearward light returning from the object lens 106 to focus on the light receiving portion 118 via the pin hole plate 109 to achieve a similar result.

Figure 14A:
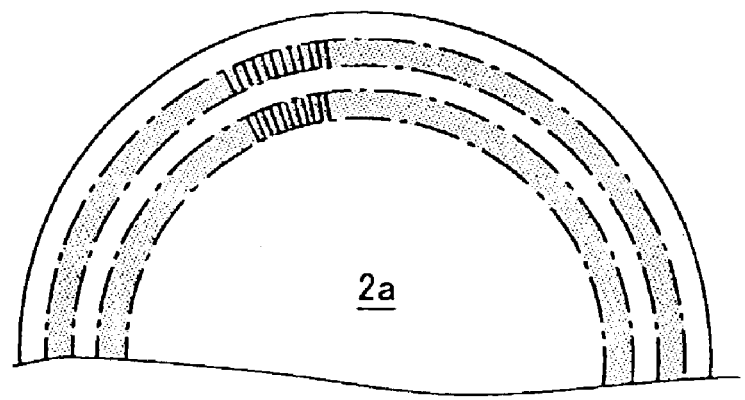
FIGS. 14A, 14B and 14C are explanatory views showing constitutions of graduation plates.
Figure 14B:
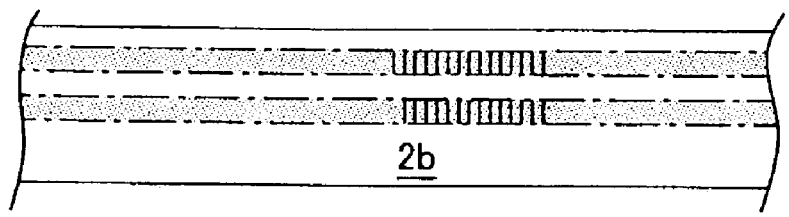
Figure 14C:
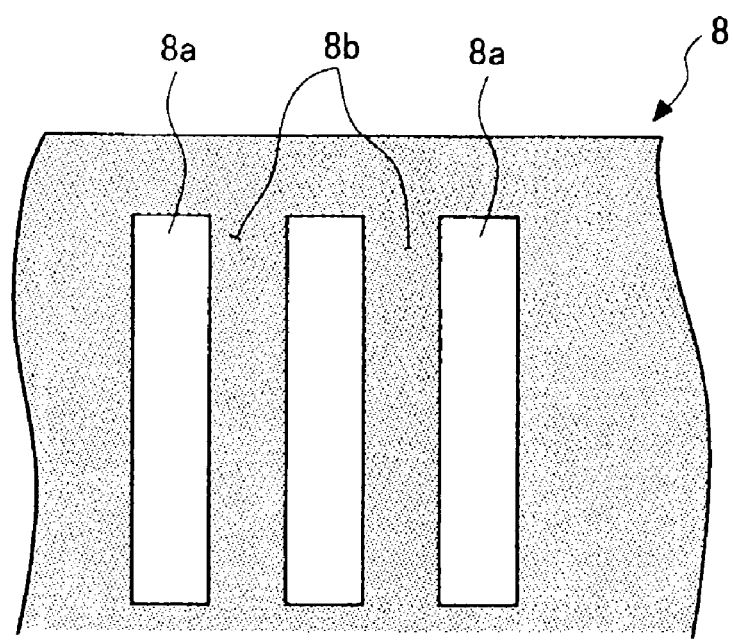

As is well known, a specific mode of the graduation plate 2 differs by whether the encoder is a rotary encoder or a linear encoder. FIGS. 14A, 14B and 14C show explanatory views showing constitutions of the graduation plate 2. As shown by FIG. 14A, in the case of a rotating disk 2a used in a rotary encoder, one row or two rows or more of the graduation lines are provided and aligned radially along concentric circles. As shown by FIG. 14B, in the case of a scale 2b used in a linear encoder, one row or two rows or more of the graduation lines are provided and arranged in parallel along linear lines.

Further, as explained above, the method of inscribing the graduation line on the graduation plate differs by whether the style of the optical reader is the transmission type or the reflection type. When the style of the optical reader is the transmission type, the graduation line is inscribed on the graduation plate by making the linear transparent portion emerge by punching a slit through a light blocking plate of a metal or carrying out etching treatment on a glass plate having the light blocking film. When the style of the optical reader is the reflection type, the graduation line is inscribed on the graduation plate by forming a mirror face reflecting portion by vapor-depositing a film made of a metal on a glass plate and making a linear transparent portion emerge by carrying out etching treatment thereafter or carrying out printing treatment having high contrast on a surface of a material plate. In the case of use requesting highly accurate positional detection, a pitch of inscribing the graduation line falls in a range of several 10 μm through several 100 μm.

The inventors have developed a graduation plate for reading reflection preferable for a reflection type optical reader adopting a telecentric type optical system. As shown by FIG. 14C, according to the graduation plate 8, a surface of a graduation line region 8a is constituted by a mirror face for regularly reflecting light from a light projecting source. Meanwhile, a middle region 8b between the graduation line regions 8a contiguous to each other is constituted by a rough face for randomly reflecting light from the light projecting source. As a material of the graduation plate 8, a metal thin plate a surface of which is brought into a mirror face state is used and the surface is selectively etched to be roughened while leaving the graduation line region 8a.

According to the graduation plate 8 having such a structure, vertically irradiated light is regularly reflected from the graduation line region 8a to return as light ray in parallel with the optical axis and therefore, contributes to focusing on the light receiving face by operation of the telecentric optical system. In contrast thereto, a component of light returned from the region 8b between the graduation lines in parallel with the optical axis is extremely small by random reflection and therefore, hardly contribute to focusing on the light receiving face by the operation of the telecentric optical system. As a result, regardless of a variation in a distance between the reflection type optical reader module 1 and the graduation plate 8, a clear image of the graduation line is always focused on the light receiving face and a highly reliable electric signal is provided thereby. In addition thereto, according to the graduation plate 8, further miniaturization of the pitch of the graduation line can be dealt with since the strength of the material plate is not significantly deteriorated.

Further, in forming the graduation line region 8a and the middle region 8b between the graduation line regions 8a on the graduation plate 8, as described above, the graduation line region 8a may be formed by the mirror face and the middle region 8b may be formed as the rough face, or the graduation line region 8a may be constituted by a rough face and the middle region 8b may be constituted by a mirror face. Further, when the rough face portion is formed on the metal thin plate the surface of which is brought into the mirror face state used as the graduation plate, the rough face portion may be formed at a predetermined region by etching the mirror face portion, or the rough face portion may be formed at the predetermined region by subjecting the mirror face metal plate to laser machining.

Figure 6:
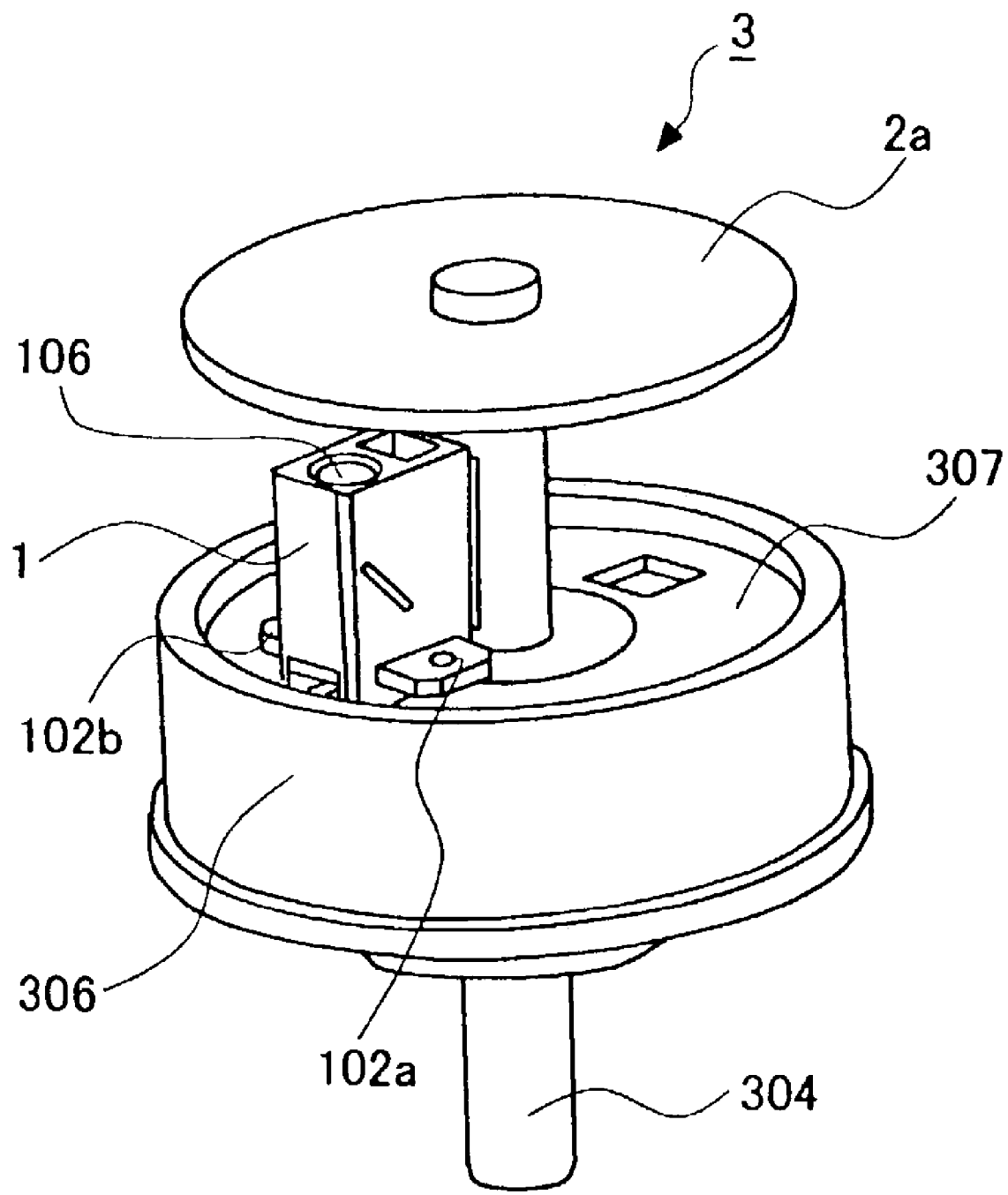
FIG. 6 is a perspective view showing a state of removing a case of the rotary encoder adopting the first module attaching method.

The reflection type optical reader module 1 shown in FIG. 1 and FIGS. 2A, 2B and 2C can be integrated to a case of a rotary encoder by several methods. FIGS. 5A, 5B and 5C show explanatory views showing a structure of a rotary encoder adopting a first method of attaching a module and FIG. 6 shows a perspective view showing a state of removing the case, respectively. Further, FIG. 5A is a left side view, FIG. 5B is a front view and FIG. 5C is a sectional view taken along a line A—A.

In FIGS. 5A, 5B and 5C, numeral 3 designates an increment type reflection type optical rotary encoder, numeral 301 designates a case in a cylindrical shape made of a metal notation 301a designates an end face plate of the case, numerals 302 and 303 designate bearings, numeral 304 designates a rotating shaft, numeral 305 designates an electric cord, numeral 306 designates an encoder main body portion made of a metal, and numeral 307 designates an output circuit board. Further, portions in FIG. 6 in correspondence with those of FIG. 1, FIGS. 2A, 2B and 2C and FIGS. 5A, 5B and 5C are attached with the same notations and an explanation thereof will be omitted.

As is apparent mainly from FIG. 5C, by making an amount of projecting the rotating shaft 304 slightly larger, a vacant portion 308 is provided between the rotating disk 2a and the encoder main body 306 and the reflection type optical reader module 1 is fixed to the encoder main body portion 306 by screws to be contained in the vacant portion 308. Since the main body portion 306 is made of a metal, the positional accuracy is improved and a variation in a positional relationship of a detecting portion by the temperature change is also restrained. In this case, a face of the rotating disk 2a for displaying the graduation line is directed to the side of the encoder main body 306 (left side in FIG. 5C) and a direction of a light projecting and receiving optical axis of the reflection type optical reader module 1 is made orthogonal to the rotating disk 2a. Since the telecentric optical system is adopted for the optical system of the reflection type optical reader module 1, it is not necessary to pay much attention to a distance between the reflection type optical reader module 1 and the rotating disk 2a, high integrating accuracy is not requested and therefore, the rotary encoder can be fabricated at row cost.

Figures 7A, 7B:
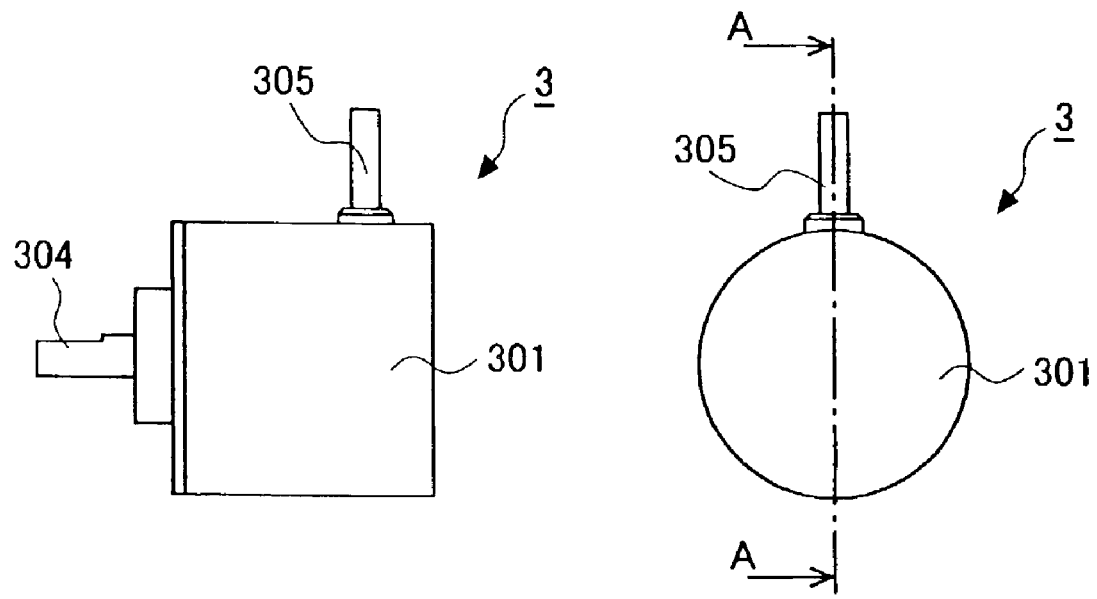
FIGS. 7A, 7B and 7C are explanatory views showing a structure of a rotary encoder adopting a second module attaching method.
Figure 7C:
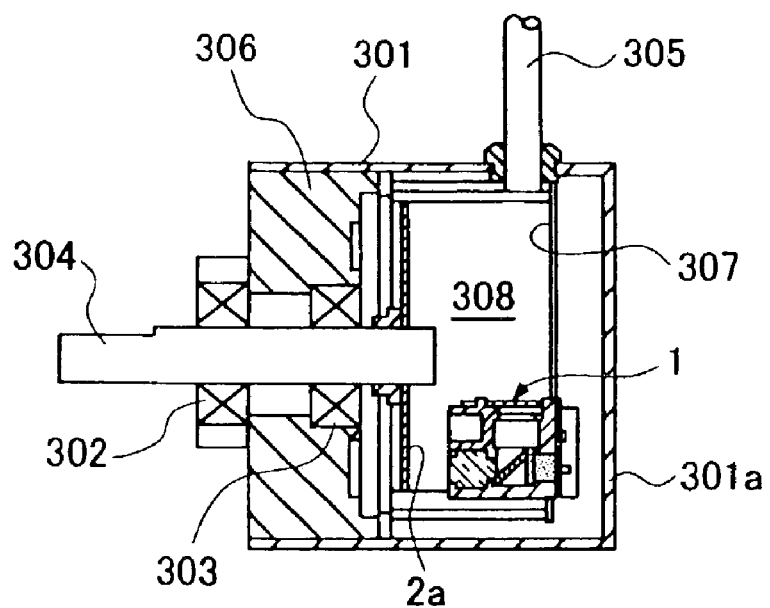
Figure 8:
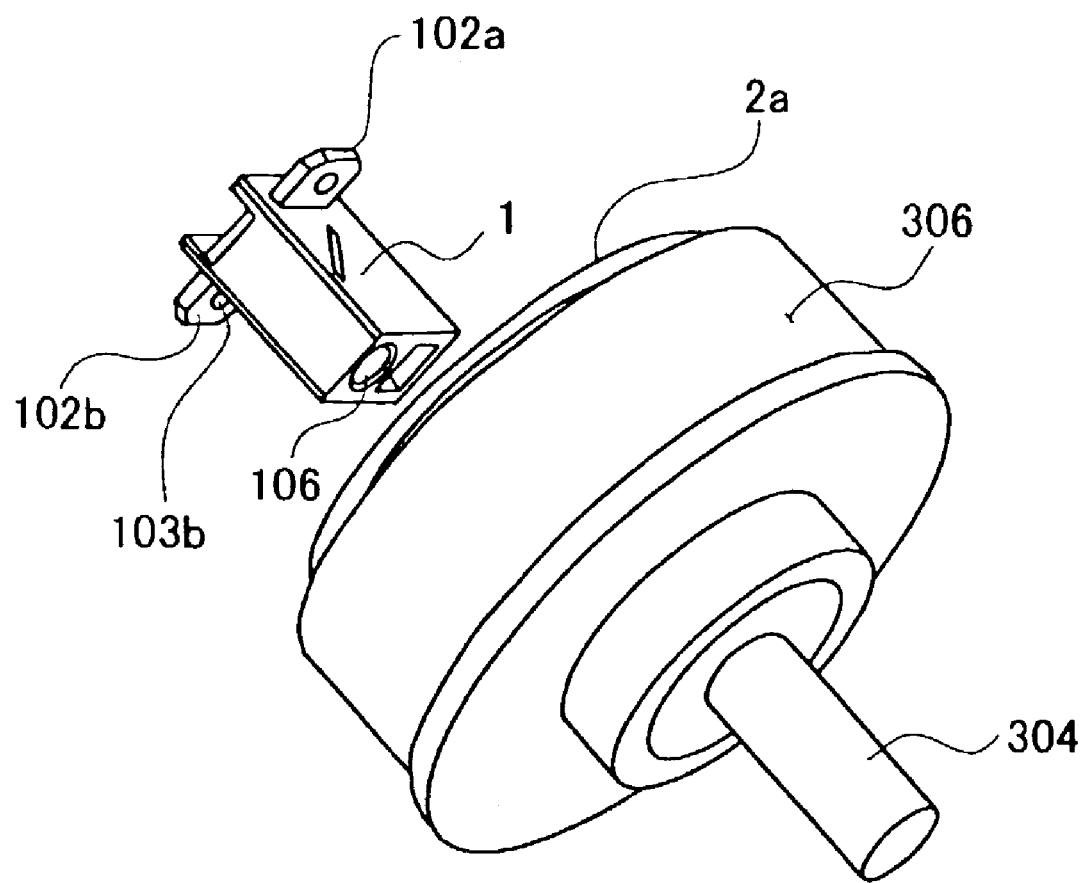
FIG. 8 is a perspective view showing a state of removing a case of the rotary encoder adopting the second module attaching method.

FIGS. 7A, 7B and 7C show a structure of a rotary encoder adopting a second module attaching method and FIG. 8 shows a perspective view showing a state of removing a case, respectively. Further, FIG. 7A is a front view, FIG. 7B is a right side view and FIG. 7C is a sectional view taken along a line A—A.

Constituent elements of FIGS. 7A, 7B and 7C are the same as those shown by FIGS. 5A, 5B and 5C, mentioned above, and therefore, attached with the same notations and an explanation thereof will be omitted. Further, portions in FIG. 8 in correspondence with those of FIG. 1, FIGS. 2A, 2B and 2C and FIGS. 7A, 7B and 7C are attached with the same notations and an explanation thereof will be omitted.

As is apparent mainly from FIG. 7C, by making the amount of projecting the rotating shaft 304 shorter, the vacant portion 308 is provided between the rotating disk 2a and the case end face plate 301a and the reflection type optical reader module 1 is fixed to the support plate 307 by screws. In this case, the face of the rotating disk 2a for displaying the graduation line is directed to the side of the case end face plate 301a (right side of FIG. 7C) and the direction of the light projecting and receiving optical shaft of the reflection type optical reader module 1 is made orthogonal to the rotating disk 2a. Also in this case, since the telecentric optical system is adopted for the optical system of the reflection type optical reader module 1, it is not necessary to pay much attention to the distance between the reflection type optical reader module 1 and the rotating disk 2a, high integrating accuracy is not requested and therefore, the encoder can be fabricated at low cost.

Figures 9A, 9B:
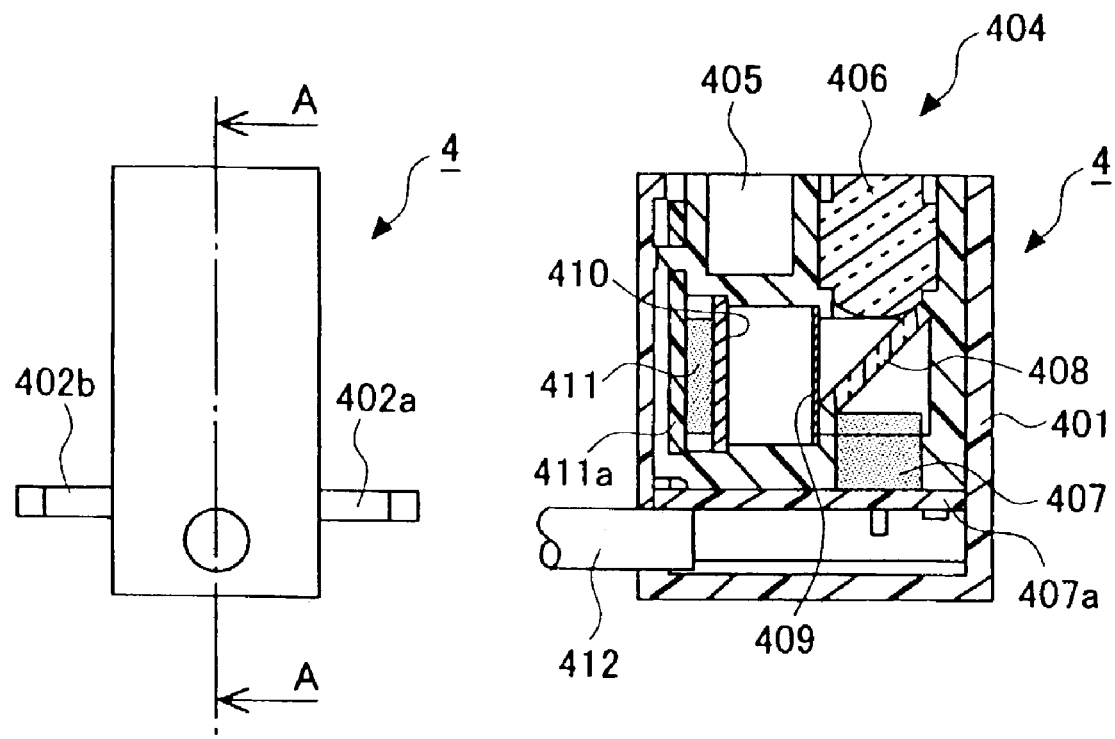
FIGS. 9A, 9B and 9C are explanatory views showing a structure of a reflection type optical reader module for a linear encoder.
Figure 9C:
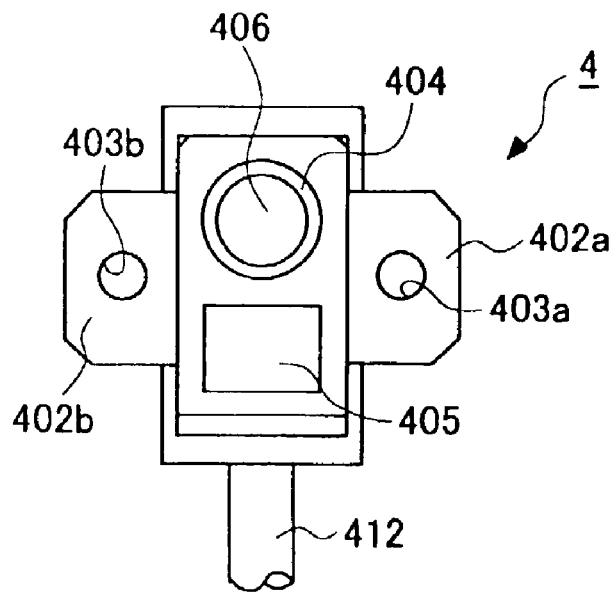
Figure 10:
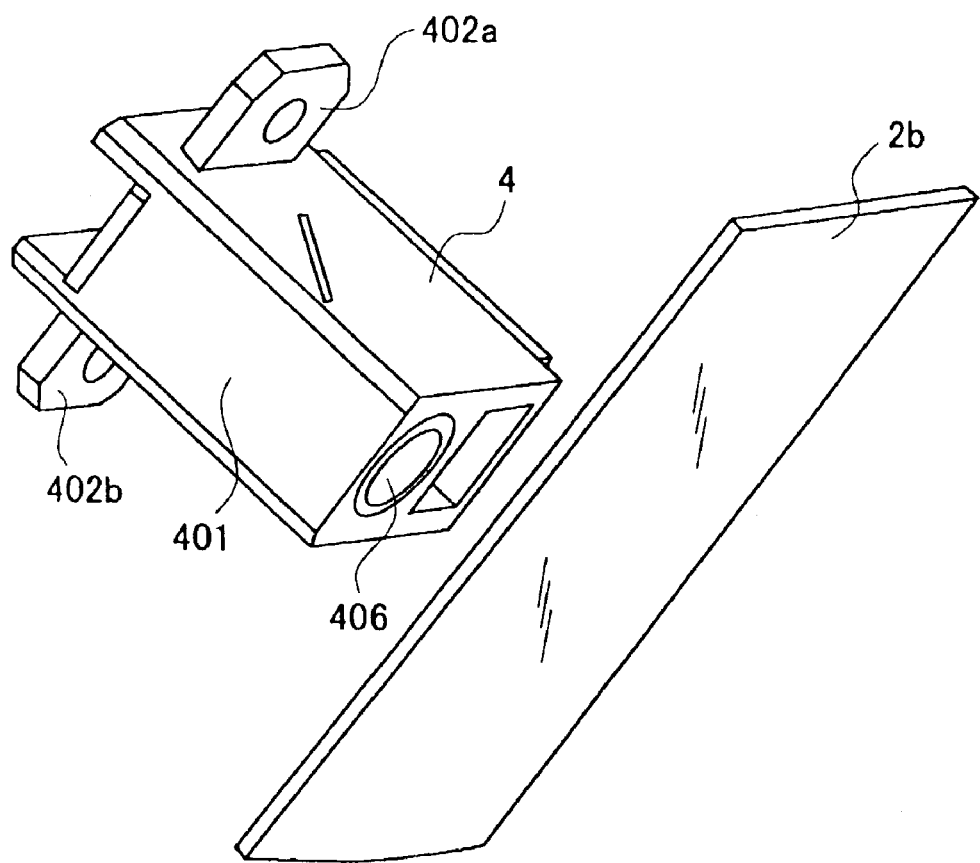
FIG. 10 is an explanatory view showing an outline of a state of attaching the module to the linear encoder.

The invention is applicable also to an optical linear encoder. FIGS. 9A, 9B and 9C show explanatory views showing a structure of a reflection type optical reader module for a linear encoder and FIG. 10 shows an explanatory view showing an outline of a state of attaching a module to the linear encoder, respectively. Further, FIG. 9A is a front view, FIG. 9B is a sectional view taken along a line A—A and FIG. 9C is a plane view.

In the drawings, notation 2b designates a linear scale which is a graduation plate, numeral 4 designates a reflection type optical reader module, numeral 401 designates a module case made of synthetic resin, notations 402a and 402b designate attaching brackets, notations 403a and 403b designate screw holes, numeral 404 designates a light projecting and receiving window, numeral 405 designates a shrinkage preventing wall cut portion of a resin mold product, numeral 406 designates an object lens, numeral 407 designates a light emitting diode (LED), notation 407a designates a light emitting diode mounting board, numeral 408 designates a half mirror, numeral 409 designates a pin hole plate, numeral 410 designates a light blocking plate, numeral 411 designates a photodiode (PD) constituting a light receiving element, notation 411a designates a photodiode mounting board, and numeral 412 designates an electric cord.

As is apparent mainly from FIG. 9B and FIG. 10, even in the case of applying to the linear encoder, arrangement of optical parts in the module case 401 is substantially similar to that in the case of applying to the rotary encoder and the reflection type optical reader module 4 fabricated in this way is supported movably relative to the linear scale 2b while being opposed thereto. Also in this case, the distance between the reflection type optical reader module 4 and the linear scale 2b can be determined comparatively roughly by the telecentric optical system.

Figure 11:
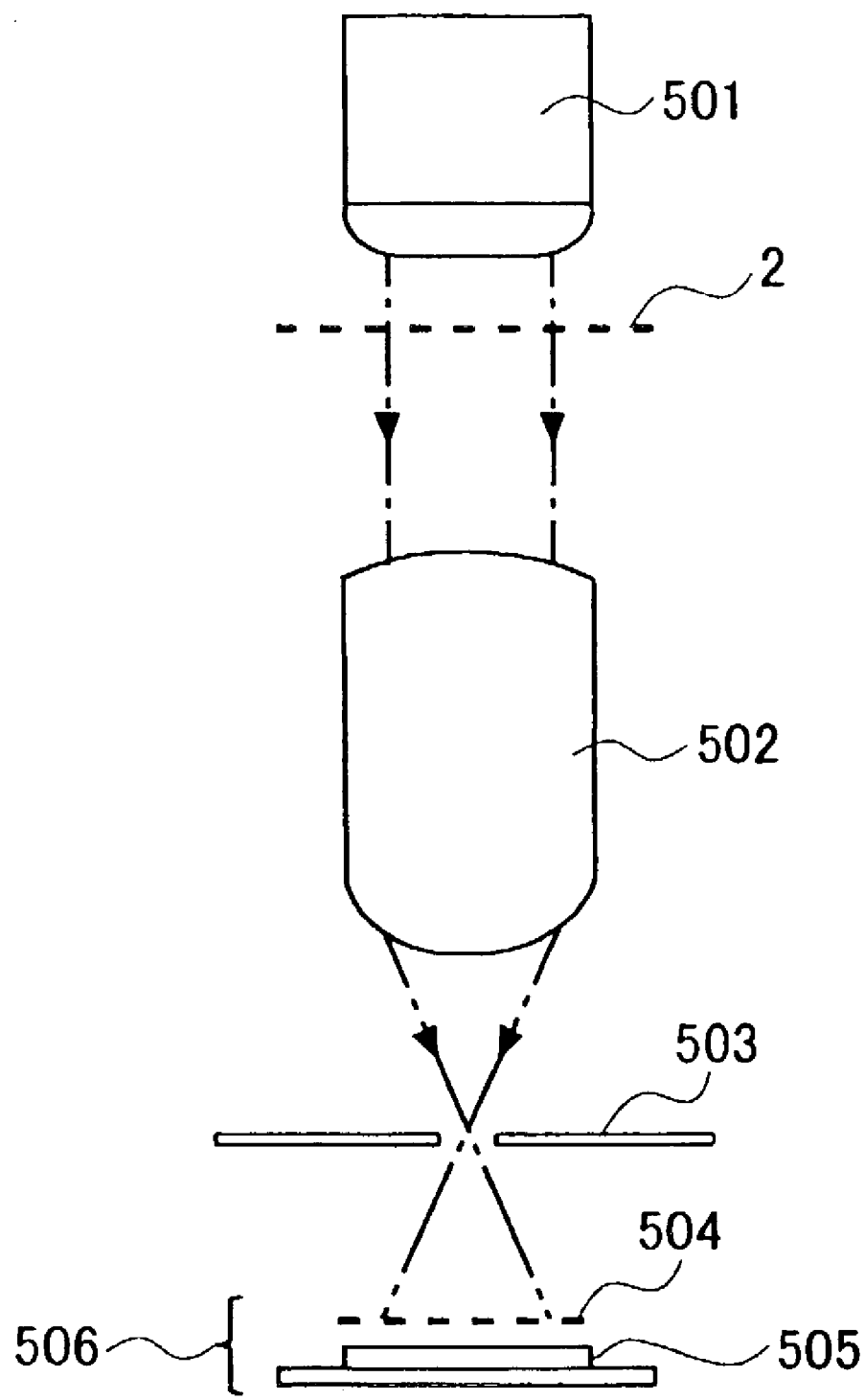
FIG. 11 is a constitution view showing a total of an optical system of a transmission type optical reader.

The invention can be realized also as a transmission type optical reader module. FIG. 11 shows a constitution view showing to take out a total of an optical system of a transmission type optical reader module. As shown by FIG. 11, the optical system includes a light projecting optical system and a light receiving optical system. The light projecting optical system includes a light projecting side source 501 for irradiating light in the form of a spot to a face on one side of the graduation plate 2 (in this example, the graduation line is constituted by a row of slits) to include a group of graduation lines. The light receiving optical system includes a light receiving side lens 502 for gathering light transmitted through the row of slits at a face on the other side of the graduation plate 2, a pin hole plate 503 arranged at a focal portion on the front side of the receiving side lens 502 and a light receiving portion 506 arranged at a focusing position of light ray after passing through the pin hole plate 503 and having a light receiving array pattern in correspondence with images of a group of graduation lines. Also in this example, the light receiving portion 506 includes a light blocking plate 504 having a slit pattern in correspondence with images of the group of graduation lines and a light receiving element 505 disposed on the back side of the light blocking plate 504 for receiving light ray transmitting through the slit pattern and the light receiving array pattern is formed by exposing the light receiving element 505 from the slit pattern of the light blocking plate 504.

According to the constitution, the light receiving optical system is integrated with a telecentric optical system comprising the light receiving side lens 502 for gathering light transmitting through the face on the other side of the graduation plate 2 and the pin hole plate 503 arranged at the focal position on the front side of the receiving side lens 502 and therefore, even when in the procedure of moving the graduation plate 2 and the optical reader relative to each other, the distance between the graduation plate 2 and the optical reader is more or less varied by, for example, applying excessively large shaft load or fluctuating the rotating disk in the rotary encoder, highly reliable positional detection can be carried out by operation of the telecentric optical system, mentioned before.

In addition thereto, since a component of stray light of light ray transmitting through the graduation plate 2 which is not in parallel with the optical axis does not contribute to focusing on the light receiving face by the operation of the telecentric optical system and therefore, even when the clearance between the light receiving optical system and the graduation plate is not strictly controlled, influence of stray light on an output electric signal can be excluded. As a result, by alleviating a request for integrating accuracy in fabrication, the cost is reduced by that amount.

Figure 12:
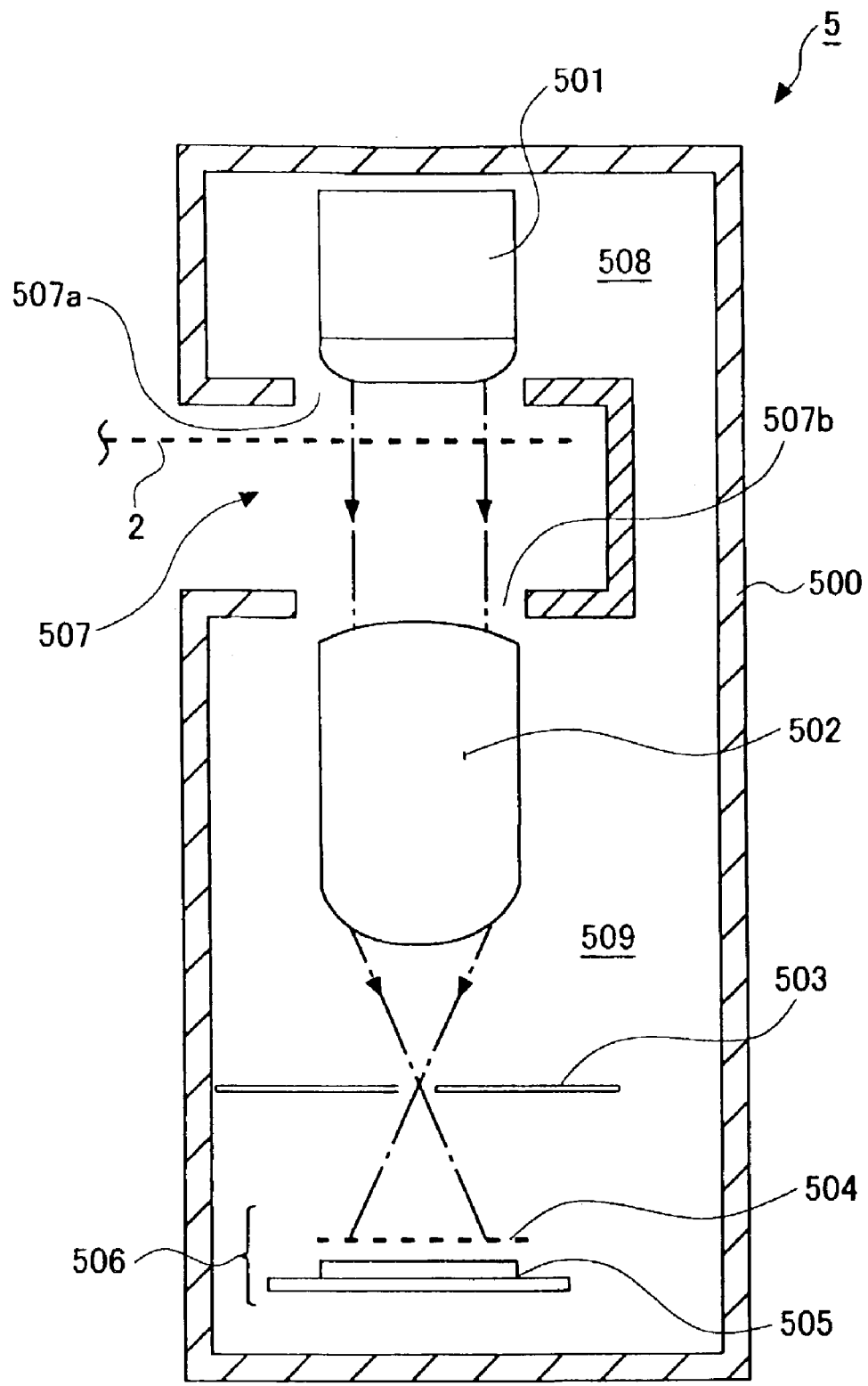
FIG. 12 is an explanatory view showing an outline of a structure of a transmission type optical reader module.

FIG. 12 shows an explanatory view showing an outline of a structure of a transmission type optical reader module adopting the optical system of FIG. 11. As shown by FIG. 12, a transmission type optical reader module 5 includes a light projecting optical system including the light projecting source 501 for irradiating light in the form of a spot to include a group of slit rows at a face on one side of the graduation plate 2, a light receiving optical system including the light receiving side lens 502 for gathering light transmitting through a face on the other side of the graduation plate 2, the pin hole plate 503 arranged at a focal position on the front side of the optical axis of the light receiving side lens 502, and the light receiving portion 506 arranged at the focusing position of light ray after passing through the pin hole portion 503 and including a light receiving array pattern in correspondence with images of the group of graduation lines. The light projecting optical system and the light receiving optical system, mentioned above, are contained in a case 500. The case 500 is constituted by a structure in which a light projecting optical system containing portion 508 and a light receiving optical system containing portion 509 are arranged to be opposed to each other by interposing an air gap portion 507 into which the graduation plate 2 is inserted. Further, notation 507a designates a light projecting window and notation 507b designates a light receiving window. Similar to the previous examples, the light receiving portion 506 includes the light blocking plate 504 having the slit pattern in correspondence with images of the group of graduation lines and the light receiving element 505 disposed on the back side of the light blocking plate 504 for receiving light ray transmitted through the slit pattern and the light receiving array pattern is formed by exposing the light receiving element 505 from the slit pattern.

According to the constitution, by only selecting the light blocking plate 504 having a slit pitch in correspondence with the slit pitch of the graduation plate 2 (rotating disk 2a or linear scale 2b), various product specifications can be dealt with by commonly using most of the parts and therefore, a reduction in cost can be achieved, further, since the light projecting optical system and the light-receiving optical system are integrally coupled, handling thereof is facilitated.

Figure 13:
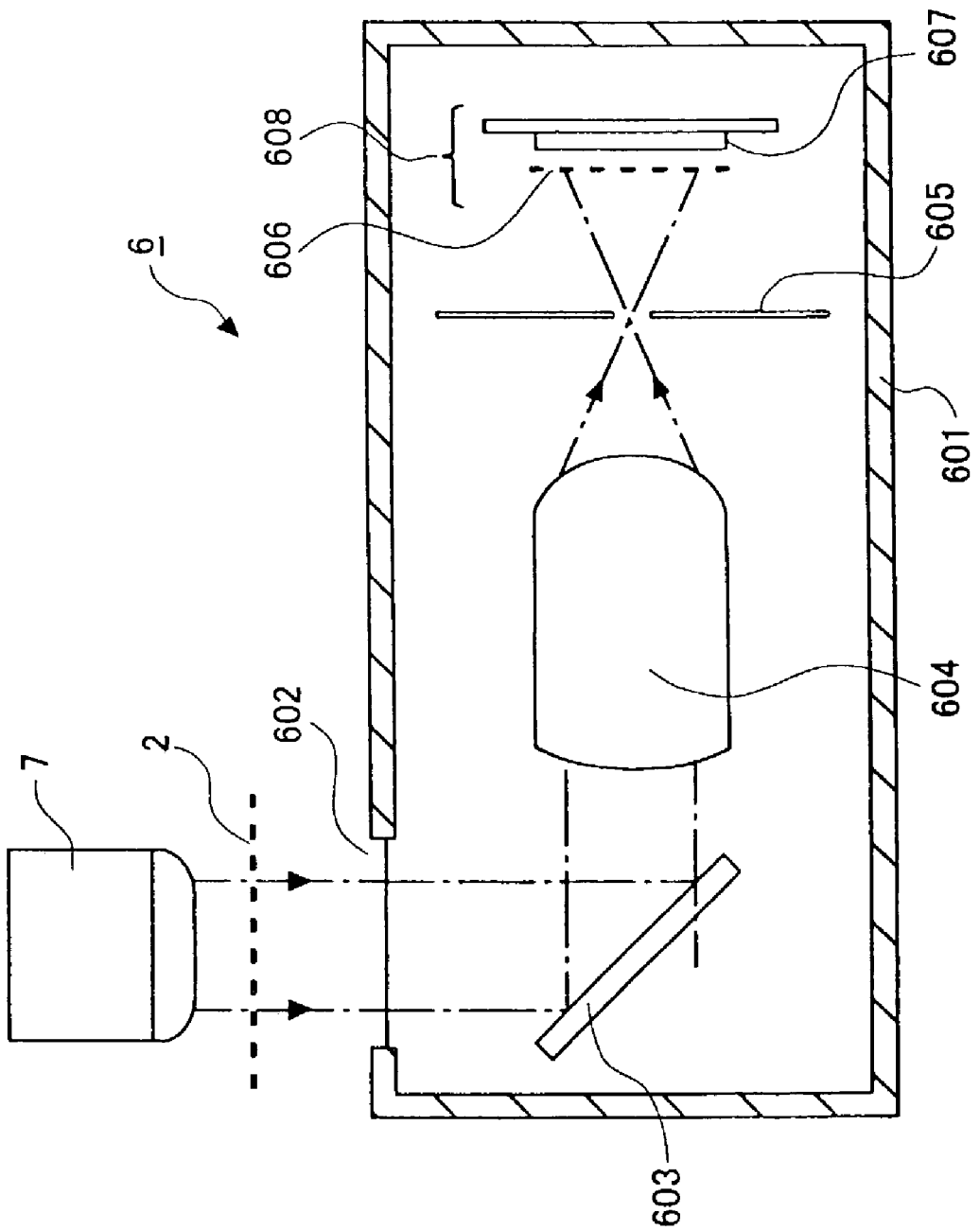
FIG. 13 is an explanatory view showing an outline of a structure of a light receiving side optical module.

According to the invention, only the light receiving side optical system in the optical system shown in FIG. 11 can be formed by a module. FIG. 13 shows an explanatory view showing an outline of a structure of a light receiving side optical module 6 provided thereby.

In FIG. 11, numeral 2 designates the graduation plate of a rotating disk or a linear scale, numeral 6 designates the light receiving side optical module, numeral 7 designates a light emitting diode (LED), numeral 601 designates a module case made of synthetic resin, numeral 602 designates a light receiving window, numeral 603 designates a mirror for bending the optical axis, numeral 604 designates a light receiving side lens, numeral 605 designates a pin hole plate, numeral 606 designates a light blocking plate, numeral 607 designates a light receiving element, and numeral 608 designates a light receiving portion.

As is apparent from FIG. 11, the light receiving side optical module 6 is constituted by integrally containing the light receiving side lens 604 for gathering light transmitting through the graduation plate 2 inscribed with the light transmitting graduation line, the pin hole plate 605 arranged at the focal position on the front side of the optical axis of the light receiving side lens 604, the light receiving portion 608 arranged at the focusing position of light ray after passing through the pin hole plate 605 and having the light receiving array pattern in correspondence images of the group of graduation lines at inside of the case 601 having the light receiving window 602 and can constitute a transmission type reader by being integrated to an optical encoder along with a light projecting side optical system. Further, the light receiving portion 608 includes the light blocking plate 606 having the slit pattern in correspondence with images of the group of graduation lines and the light receiving element 607 disposed on the back side of the light blocking plate 606 for receiving light ray transmitting through the slit pattern and the light receiving array pattern is formed by exposing the light receiving element 607 from the slit pattern.

According to the light receiving side optical module 6, by reason similar to the above-described, transmission type optical encoders having various product specifications can flexibly be dealt with and in addition thereto, the optical axis is bent by the mirror 603 and therefore, thin formation of the module can be realized.

Figure 15:
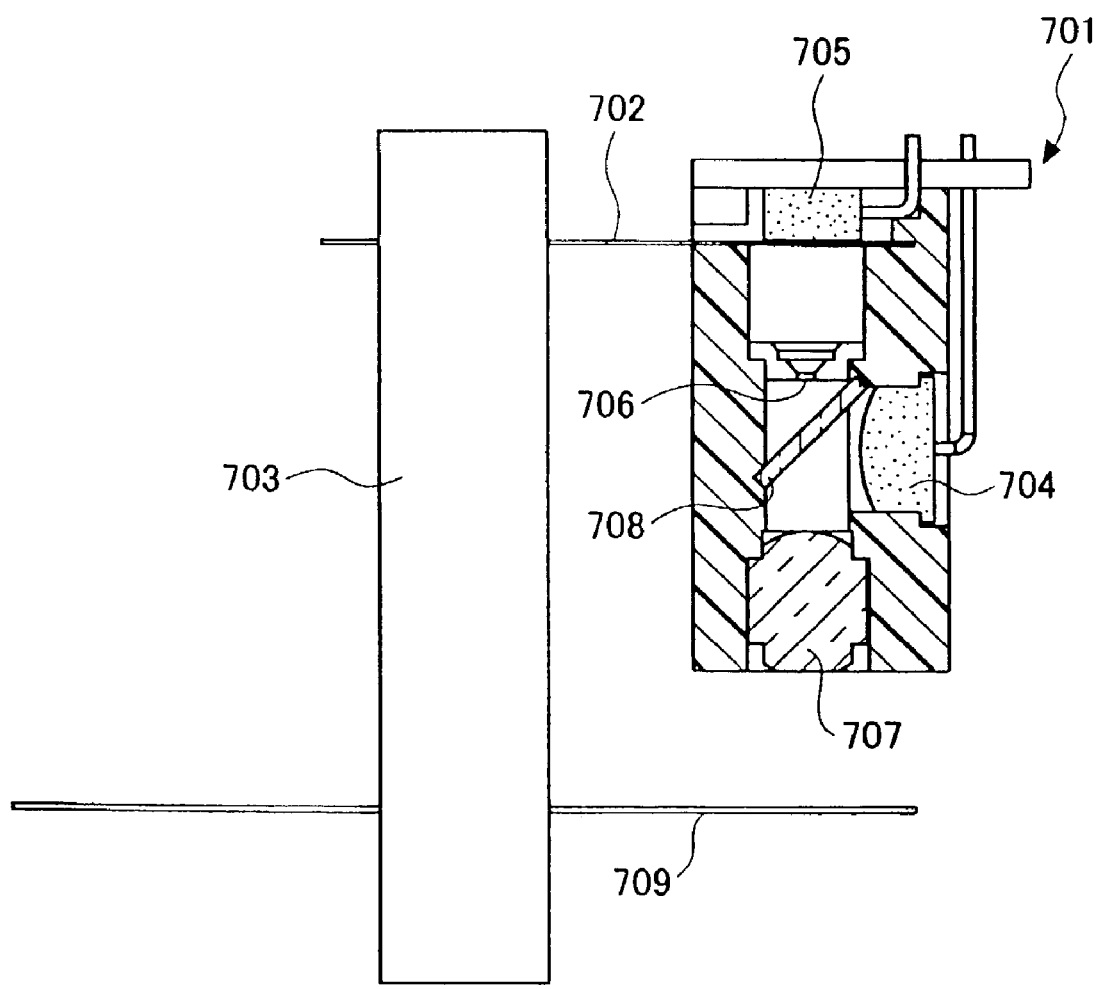
FIG. 15 is a view for explaining preferable means for positioning a light blocking plate and a graduation plate (part 1)
Figure 16:
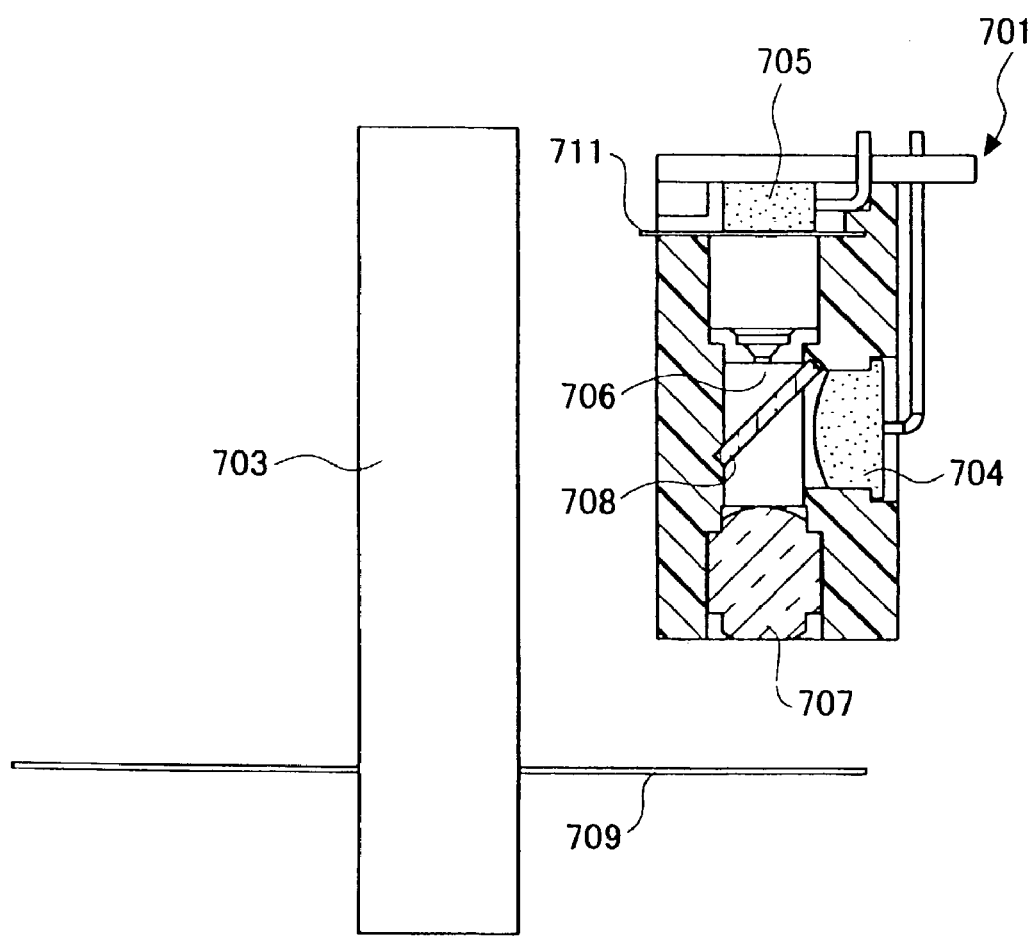
FIG. 16 is a view for explaining the preferable means for positioning the light blocking plate and the graduation plate (part 2)

Next, an explanation will be given of means preferable in integrating a light blocking plate in a reflection type optical reader module and positioning the light blocking plate relative to the graduation plate in a reflection type optical reader in reference to FIGS. 15, 16 and 17. In the drawings, numeral 701 designates a reflection type optical reader module, numeral 702 designates a positioning plate, numeral 703 designates a rotating shaft of a rotating disk, numeral 704 designates a light emitting diode (LED), numeral 705 designates a light receiving element, numeral 706 designates a pin hole, numeral 707 designates a lens, numeral 708 designates a half mirror, and numeral 709 designates a graduation plate (rotating disk).

Figure 17:
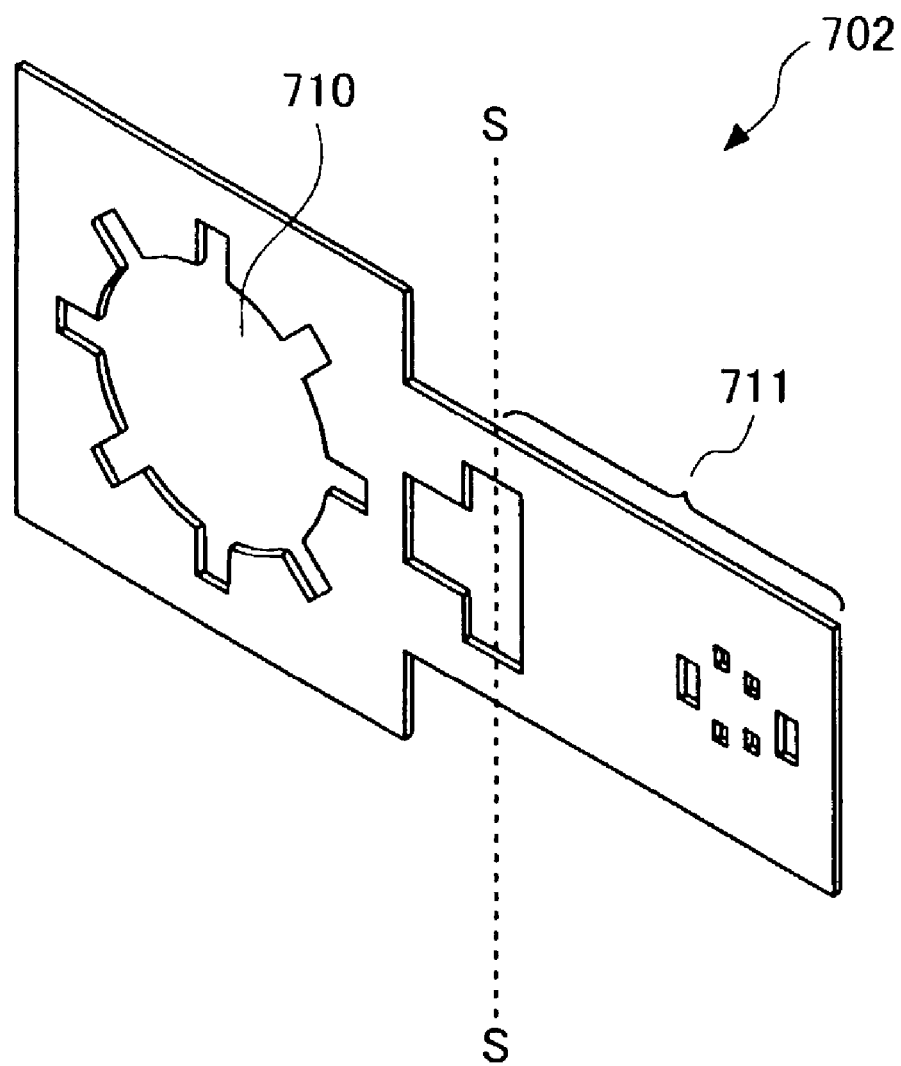
FIG. 17 is a view for explaining the preferable means for positioning the light blocking plate and the graduation plate (part 3)

FIG. 17 is a view showing an outlook of the positioning plate 702 and as shown by FIG. 17, the positioning plate 702 is constituted by integrating a portion thereof constituting a light blocking plate 711 and a portion thereof having an inserting hole 710 for inserting and fitting the rotating shaft 703. By fitting the rotating shaft 703 to the inserting hole 710, as shown by FIG. 15, the light blocking plate 711 can easily be positioned relative to the graduation plate 709 in integrating the light blocking plate 711 to the reflection type optical reader module 701. Further, after finishing the positioning operation, an unnecessary portion is cut along a cut line indicated by a dotted line S—S and only the light blocking plate 711 is integrated to the reflection type optical reader module 701. FIG. 16 shows a state in which the unnecessary portion of the positioning plate 702 is cut and only the light blocking plate 711 is integrated to the reflection type optical reader module 701.

By using the positioning means, it is not necessary to position the reflection type optical reader module 701 relative to the graduation plate 709 while looking at an electric signal from an output line of the reflection type optical reader module. Therefore, the reflection type optical reader module 701 integrated with the light blocking plate 711 can accurately and easily be positioned relative to the graduation plate 709 via the rotating shaft 703.

Further, although the means for positioning the light blocking plate relative to the graduation plate is applied to the reflection type optical reader module for convenience of explanation, naturally, the means can be realized as means for positioning the light blocking plate relative to the graduation plate applied to a transmission type optical reader module.

Next, a simple explanation will be given of electric processings with regard to an output signal of a light receiving element constituting an optical reader. As is well known, for example, in the case of an increment type encoder, a single phase or a multi-phase pulse row outputted from a light receiving element is subjected to an amplifying processing and a waveform shaping processing to convert into a rectangular pulse row and by pertinently counting the rectangular pulse row, information in correspondence with a moving amount or position is provided.

Figure 18:
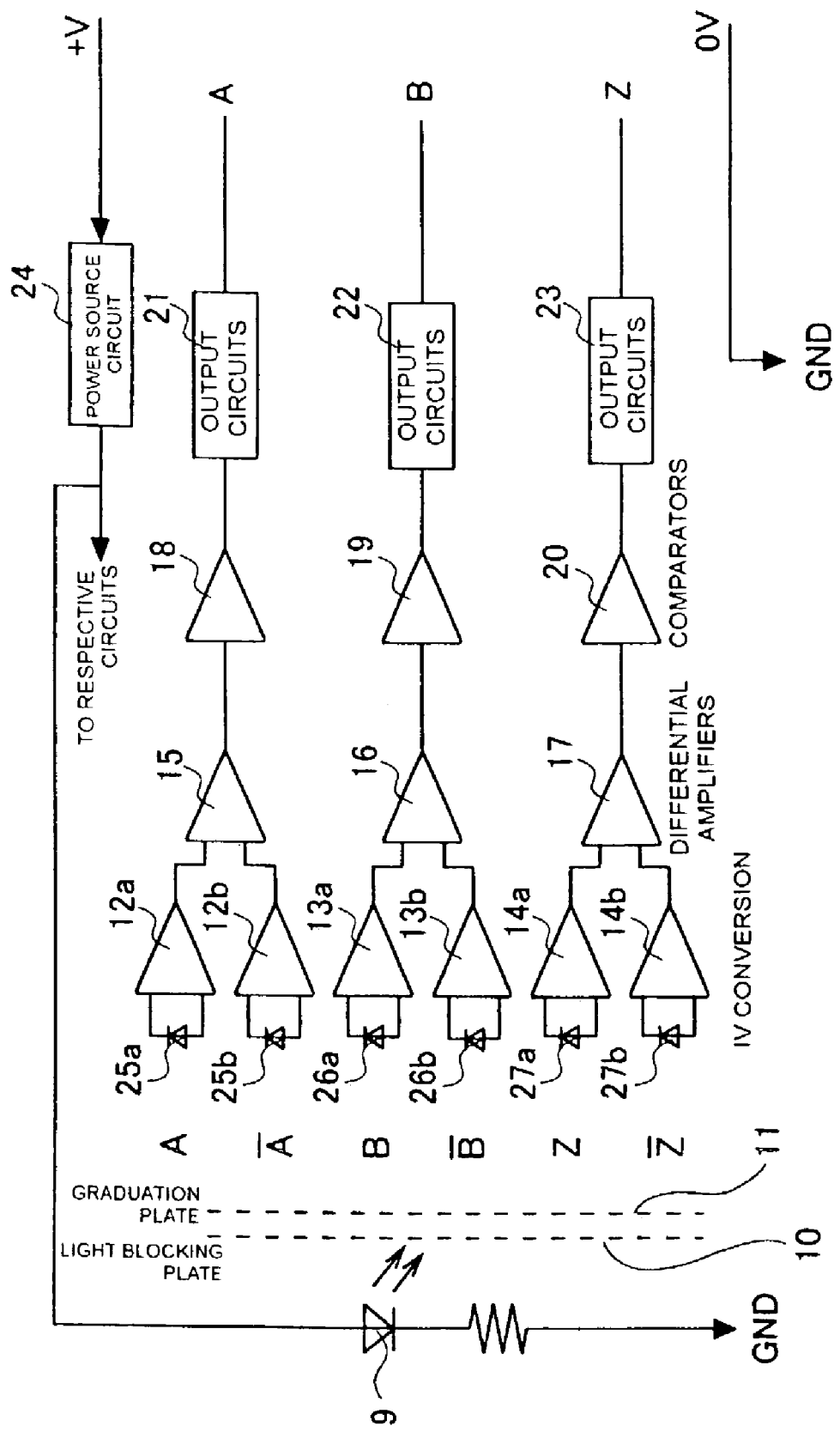
FIG. 18 is a circuit diagram showing an outline of an electric constitution of an optical encoder.
Figure 21:
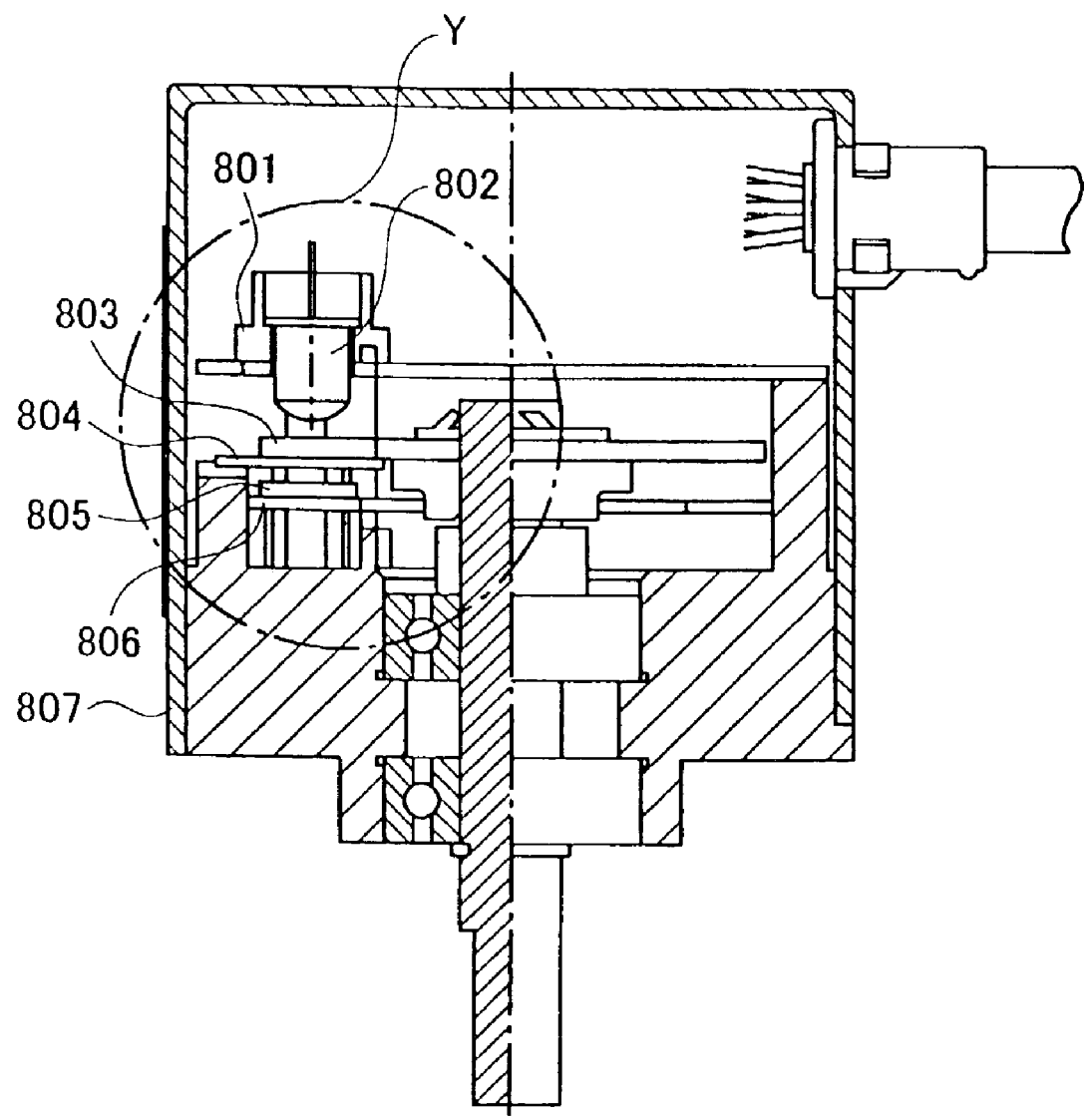
FIG. 21 is an explanatory view showing a structure of a transmission type rotary encoder used in a related art.
Figure 22:
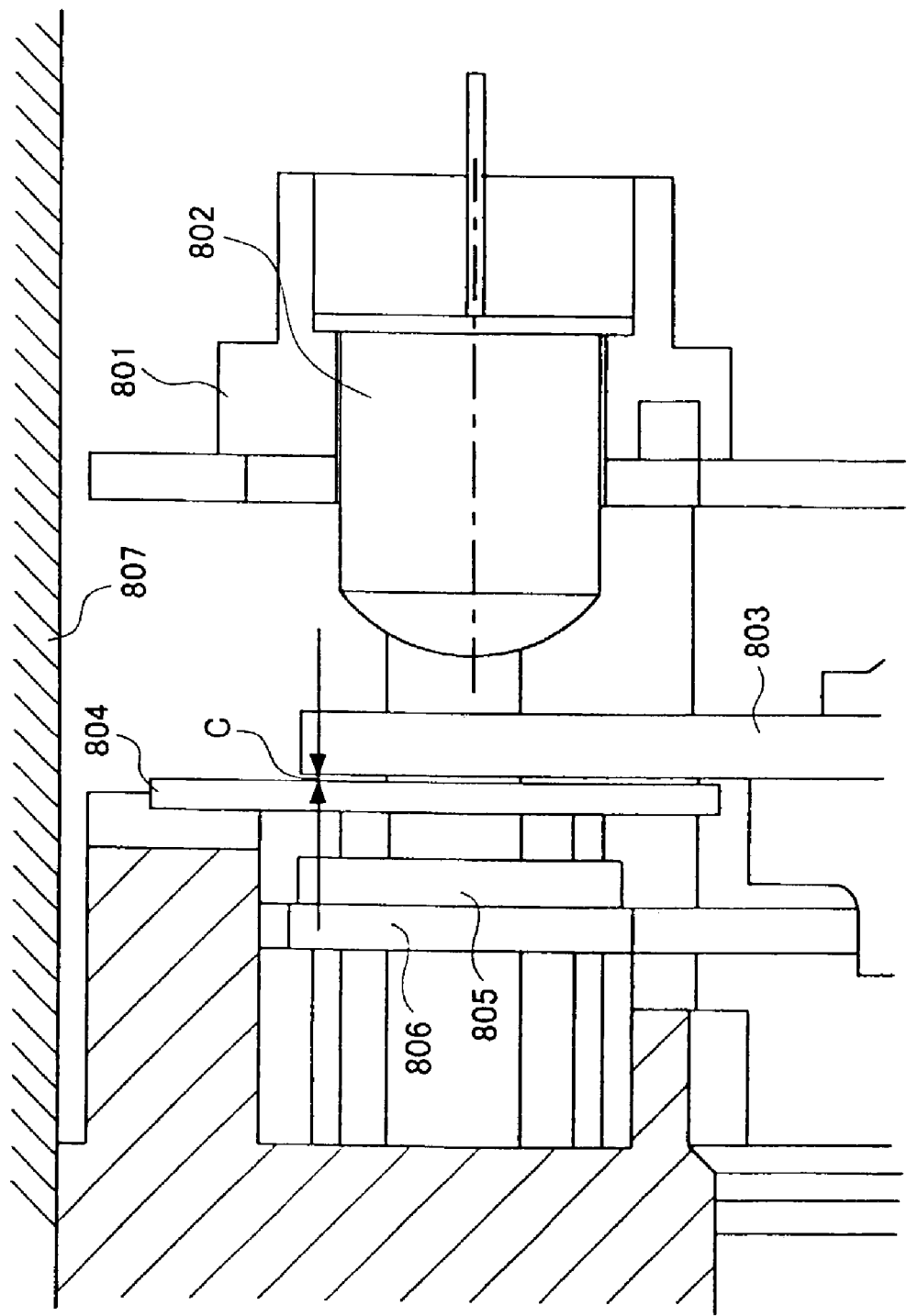
FIG. 22 is an explanatory view enlarging an essential portion of the transmission type rotary encoder used in the related art.

FIG. 18 shows an example of a circuit diagram showing an outline of an electric constitution of an optical encoder (transmitting type in this example). Light from a light emitting diode (LED) 9 constituting a light projecting source transmits through a slit row on a graduation plate 10 and a slit row on a light blocking plate 11 and thereafter irradiated to a light receiving face of a photodiode (PD) constituting a light receiving element. In this example, 6 rows of slit rows in parallel with each other or in shapes of concentric circles are formed on the graduation plate 10. Initial 2 rows correspond to A phase and constituted by 2 rows of slit rows having a phase difference of 180 degrees relative to each other. Successive 2 rows corresponds to B phase and is also constituted by 2 rows of slit rows having a phase difference of 180 degrees relative to each other. Final 2 rows corresponds to Z phase and is also provided with a phase difference of 180 degrees relative to each other. Light transmitting through 2 rows of the slit rows constituting A phase is respectively received by photodiodes 25a and 25b. Light transmitting through 2 rows of the slit rows constituting B phase is respectively received by photodiodes 26a and 26b. Light transmitting through 2 rows of the slit rows constituting Z phase is respectively received by photodiodes 27a and 27b. Output current of 2 pieces of the photodiodes 25a and 25b for carrying A phase are respectively subjected to I/V conversion by I/V converters 12a and 12b and thereafter an amount of a change is emphasized via a differential amplifier 15. Output current of 2 pieces of photodiodes 26a and 26b for carrying B phase are respectively subjected to I/V conversion by I/V converters 13a and 13b and an amount of change is emphasized via a differential amplifier 16. Output current of 2 pieces of photodiodes 27a and 27b for carrying Z phase are respectively subjected to I/V conversion by I/V converts 14a and 14b and an amount of change is emphasized via a differential amplifier 17. The respective outputs of the differential amplifiers 15, 16 and 17 are respectively binarized by comparators 18, 19 and 20 disposed at later stages thereof, thereafter adjusted to drive levels via output circuits 21, 22 and 23 and outputted to outside as an A phase signal, a B phase signal and a Z phase signal. Further, notation 24 designates power source circuit for supplying power source to respective circuits.

Finally, a specific example of a telecentric optical system preferable for the optical reader for the encoder according to the invention will be disclosed. The most important point in the optical system resides in focusing the graduation line pattern on the graduation plate clearly on the light receiving face. The clearness of the graduation line pattern on the light receiving face can qualitatively evaluated by calculating a modulation value M based on a waveform of an output electric signal from the light receiving element. That is, it can be said that the larger the value of the modulation value M (maximum "1") the higher the clearness. Here, when a peak value of the waveform of the output electric signal from the light receiving element is designated by notation Emax and a bottom value thereof is designated by notation Emin, the modulation value M can be represented by the following equation.

$$M=(Emax-Emin)/(Emax+Emin)$$

As shown by an optical model of FIG. 19A, by adopting one lump of an aspherical lens (magnification=1) for a lens as a premise and designating a distance (focal distance) between the lens and the pin hole by notation F, designating a thickness of the lens by notation T and designating the distance between the lens and the graduation plate by notation S, a relationship between the focal distance F and the modulation value M will be investigated.

Then, as shown by a table of FIG. 19B and a graph of FIG. 19C, when the focal distance F is increased as 3.2, 3.6, 4.0, 5.0 while fixing the distance S between and lens and the graduation plate and the lens thickness T as 5 mm, it is found that although the value of the modulation value M stays to be constant to some degree of the focal distance F, the modulation value M is reduced after exceeding a vicinity of F=3.6.

As shown by an optical model of FIG. 20A, by adopting one lump of an aspherical lens (magnification=1) for the lens as the premise, designating the distance (focal distance) between the lens and the pin hole by notation F, designating the thickness of the lens by notation T and designating the distance between the lens and the graduation plate by notation S, the relationship between the lens thickness T and the modulation value M will be investigated.

Then, as shown by a table of FIG. 20B and a graph of FIG. 20C, when the lens thickness T is increased as 4.0, 5.0, 6.0 while respectively fixing the distance S between the lens and the graduation plate as 5 mm and the focal distance as 4.7 mm, it is found that the value of the modulation value M is maximized at a vicinity of the lens thickness of T=5.0.

When the optical reader module 1 adopting the coaxial radiating type optical system shown in FIG. 1 through FIG. 4 is assumed, due to a relationship with the space of arranging the half mirror 108, the focal distance F cannot be reduced so much.

From the above-described, on the premise of realizing the optical reader module 1 adopting the coaxial radiating type optical system shown by FIG. 1 through FIG. 4 and using the one lump of the aspherical lens (magnification=1) for the lens, it is concluded that F=3.6, that is, S=T=1.4F is an optimum condition.

Further, it is found by the investigation in FIG. 19 that when S and T are 5 mm, F≦4 mm is preferable. Therefore, in the optical encoder, when one lump of the aspherical lens is used as the telecentric optical system and the relationship of T>1.2F is specified in the relationship between the lens thickness (T) and the focal distance (F), the clearness of the graduation line pattern focused on the light receiving face is improved.

Further, it is found by the investigation in FIG. 20 that when S=5 mm and F=4.7 mm, T is preferable to be 5 mm. Therefore, in the optical encoder, when one lump of the aspherical lens is used as the telecentric optical system and the relationship of 1.2T>S>0.8T is specified for the relationship between the lens thickness (T) and the distance (S) between the lens and the graduation plate, the clearness of the graduation line pattern focused on the light receiving face is improved.

As is apparent from the above-described explanation, according to the invention, the optical encoder dispensing with high integrating accuracy and capable of being fabricated at low cost can be provided.

Further, according to the invention, the optical encoder in which the output signal from the optical reader can stably be maintained even when the distance between the graduation plate and the optical reader is more or less varied can be provided.

Further, according to the invention, by dispensing with parallel light as the light projecting source, the reflection type optical encoder capable of being fabricated at low cost by using ordinary LED without using an expensive light emitting part such as a point light source LED, an LED with lens or a laser diode (LD) can be provided.

Further, according to the invention, the reflection type optical reader module having high general purpose performance capable of easily realizing the optical reader in correspondence with graduation plates having various graduation line pitches by only interchanging a small number of parts in accordance with the graduation line pitch of the graduation plate used can be provided.

Further, according to the invention, the transmission type reader module capable of easily realizing the transmission type optical reader in correspondence with various graduation line pitches by only interchanging a small number of parts in accordance with the graduation plate having the graduation line pitch of the graduation plate used can be provided.

Further, according to the invention, the light receiving side optical module capable of easily realizing the transmission type reader in correspondence with various graduation line pitches by only interchanging a small number of parts in accordance with the graduation plate having the graduation line pitch of the graduation plate used can be provided.

Further, according to the invention, the graduation plate preferable for the optical encoder or the reflection type optical reader module and capable of easily dealing with a highly fine pitch can be provided.

What is claimed is:

1. An optical encoder including a graduation plate inscribed with graduation lines along a predetermined direction and an optical reader for optically reading the graduation lines on the graduation plate, wherein a corresponding electric signal is outputted from the optical reader in accordance with movement of the graduation plate and the optical reader relative to each other; and wherein the optical reader includes a light projecting optical system for irradiating light from a light projecting source to the graduation plate and a light receiving optical system for focusing light from the graduation plate on a light receiving portion and the light receiving optical system comprises a telecentric optical system, wherein the optical reader further includes an object lens, a pin hole plate arranged at a focal position of the object lens, and a light receiving portion arranged at an image plane of light after passing through the pin hole plate and including a light receiving array pattern in correspondence with images of the group of the graduation lines, wherein the light receiving portion includes a light blocking plate having a slit pattern in correspondence with images of the group of the graduation lines and a light receiving element disposed on a back side of the light blocking plate for receiving light transmitting through the slit pattern and the light receiving array pattern is formed by exposing the light receiving element from the slit pattern.

2. The optical encoder according to claim 1, wherein the graduation lines on the graduation plate are provided with a light transmitting performance and the optical reader is a transmission type optical reader constituted by coaxially and opposedly arranging the light projecting optical system and the light receiving optical system while interposing the graduation plate;

wherein the light projecting optical system irradiates light from the light projecting source onto a face on one side of the graduation plate in the form of a spot to include a group of the graduation lines.

3. The optical encoder according to claim 1, wherein the graduation lines on the graduation plate are provided with a light reflecting performance and the optical reader is a reflection type optical reader including a coaxial optical system; and wherein the coaxial optical system includes the light projecting source, the object lens which is used both for projecting and receiving light for irradiating light from the light projecting to the graduation plate as parallel light in the form of a spot to include a group of the graduation lines and gathering reflected light from the graduation plate, an optical separator for transmitting projecting light from the light projecting source to the object lens and turning light from the object lens to the light receiving portion including the light receiving array pattern, and pin hole plate arranged at the focal position of the object lens on a returning light axis, wherein said returning light is turned via the optical separator.

4. The optical encoder according to claim 3, wherein a region of the graduation lines on the graduation plate comprises a mirror face and a region between the graduation lines comprises a rough face.

5. The optical encoder according to claim 1, wherein the graduation plate and the optical reader are supported linearly movably relative to each other and the graduation lines are inscribed on the graduation plate along a movement linear line.

6. The optical encoder according to claim 1, wherein the graduation plate and the optical reader are supported rotationally movably relative to each other and the graduation lines are inscribed on the graduation plate along a movement circumference.

7. A reflection type optical reader module comprising;

a light projecting source, an object lens used both for projecting and receiving light for irradiating light from the light projecting source to a graduation plate as parallel light in the form of a spot to include a group of graduation lines and gathering reflected light from the graduation plate, a light receiving portion arranged at an image plane of returning light from the object lens and including a light receiving array pattern in correspondence with images of a group of the graduation lines, an optical separator for transmitting projecting light from the light projecting source to the object lens and turning the returning light from the object lens to the light receiving portion including the light receiving array pattern, and a pin hole plate arranged at a focal position of the object lens on a returning light axis, wherein said returning light is turned via the optical separator and directed by the optical separator to the pin hole plate;

wherein said light projecting source, said object lens, said light receiving portion, said optical separator, and said pin hole plate are integrally contained in a case having a window used both for projecting and receiving light, and wherein said reflection type optical reader module can be integrated to an optical encoder, wherein the light receiving portion includes a light blocking plate having a slit pattern in correspondence with the images of a group of the graduation lines and a light receiving element disposed on a back side of the light blocking plate for receiving light transmitted through the slit pattern and the light receiving array pattern is formed by exposing the light receiving element from the slit pattern.

8. A transmission type optical reader module comprising;

a light projecting optical system including a light projecting source for irradiating light onto a face on one side of a graduation plate in the form of a spot to include a group of graduation lines, a light receiving optical system including a light receiving lens for gathering light transmitted through a face on an other side of the graduation plate, a pin hole plate arranged at a focal position on a front side of an optical axis of the light receiving lens, and a light receiving portion arranged at an image plane of light after passing through the pin hole plate and having a light receiving array pattern in correspondence with images of a group of graduation lines;

wherein said light projecting optical system and said light receiving optical system are integrally contained in a case arranged oppositely together while interposing an air gap portion, wherein the graduation plate is inserted; and wherein said transmission type optical reader module can be integrated to an optical encoder.

9. The transmission type optical reader module according to claim 8, wherein the light receiving portion includes a light blocking plate having a slit pattern in correspondence with the images of a group of the graduation lines and a light receiving element disposed an a back side of the light blocking plate for receiving light transmitted through the slit pattern and the light receiving array pattern is formed by exposing the light receiving element from the slit pattern.

10. A light receiving optical module comprising;
a light receiving lens for gathering light transmitted through a graduation plate inscribed with a group of light transmitting graduation lines,
a pin hole plate arranged at a focal position on a front side of an optical axis of the light receiving lens, and
a light receiving portion arranged at an image plane of light after passing through the pin hole plate and having a light receiving array pattern in correspondence with images of the group of graduation lines,
wherein said light receiving lens, said pin hole plate, and said light receiving portion are integrally contained in a case having a light receiving window; and wherein a transmission type reader can be constituted by integrating said light receiving optical module to an optical encoder along with a light projecting optical system, wherein the light receiving portion includes a light blocking plate having a slit pattern in correspondence with the images of a group of the graduation lines and a light receiving element disposed on a back side of the light blocking plate for receiving light transmitted through the slit pattern and the light receiving array pattern is formed by exposing the light receiving element from the slit pattern.

11. The module according to claim 7, wherein the light blocking plate constituting the light receiving portion is made attachable and detachable separately from the light receiving element.

12. The optical encoder according to claim 3, wherein one lump of an aspherical lens is used as the telecentric optical system and a relationship of $T>1.2F$ is specified between a thickness (T) and a focal distance (F) of the lens.

13. The optical encode according to claim 3, wherein one lump of an aspherical lens is used for the telecentric optical system and a relationship of $1.2T>S>0.8T$ is specified between a thickness (T) of the lens and a distance (S) between the lens and the graduation plate.

* * * * *